US012618981B2

(12) United States Patent
Ghimire et al.

(10) Patent No.: US 12,618,981 B2
(45) Date of Patent: May 5, 2026

(54) POSITIONING INTEGRITY IN WIRELESS NETWORKS

(71) Applicant: Fraunhofer-Gesellschaft zur Foerderung der angewandten Forschung e.V., Munich (DE)

(72) Inventors: Birendra Ghimire, Erlangen (DE); Mohammad Alawieh, Erlangen (DE); Norbert Franke, Erlangen (DE); Ivana Lukcin, Erlangen (DE); Johannes Rossouw Van Der Merwe, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 320 days.

(21) Appl. No.: 18/302,544

(22) Filed: Apr. 18, 2023

(65) Prior Publication Data

US 2023/0258815 A1 Aug. 17, 2023

Related U.S. Application Data

(63) Continuation of application No. PCT/EP2021/079110, filed on Oct. 20, 2021.

(30) Foreign Application Priority Data

Oct. 20, 2020 (EP) .................................... 20202849

(51) Int. Cl.
*G01S 19/20* (2010.01)
*G01S 19/08* (2010.01)
*G01S 19/47* (2010.01)
(52) U.S. Cl.
CPC .............. *G01S 19/20* (2013.01); *G01S 19/08* (2013.01); *G01S 19/47* (2013.01)

(58) Field of Classification Search
CPC ........... G10S 19/20; G01S 19/08; G01S 19/47
See application file for complete search history.

(56) References Cited

U.S. PATENT DOCUMENTS

| | | | |
|---|---|---|---|
| 2017/0070971 A1 | 3/2017 | Wietfeldt et al. | |
| 2019/0113625 A1 | 4/2019 | Farmer et al. | |
| 2023/0328525 A1* | 10/2023 | Shreevastav | ........ H04W 12/041 455/456.1 |

OTHER PUBLICATIONS

3GPP TS 37.355 V16.2.0 (Sep. 2020)—3rd Generation Partnership Project; Technical Specification Group Radio Access Network; LTE Positioning Protocol (LPP) (Release 16) (296 pages).

(Continued)

*Primary Examiner* — Curtis B Odom
(74) *Attorney, Agent, or Firm* — Perkins Coie LLP; Michael A. Glenn

(57) ABSTRACT

A first apparatus comprises a GNSS receiver configured to receive GNSS signals, a mobile communication transceiver configured to operate in a mobile communication network, wherein the first apparatus is configured to determine at least one parameter based on the received GNSS signals or use at least one parameter determined by a second or third apparatus based on GNSS measurements, wherein the first apparatus is configured to receive with the mobile communication transceiver an information message from a second apparatus or a third apparatus of the mobile communication network, the information message comprising an integrity information describing an integrity status of the GNSS signals, wherein the first apparatus is configured to at least one out of determine the at least one parameter in dependence on the integrity information, report the at least one parameter taking into account the integrity information, take a specific action in dependence on the integrity information.

19 Claims, 12 Drawing Sheets

(56)         References Cited

OTHER PUBLICATIONS

CATT: "Discussion on signalling and procedures to support GNSS positioning integrity", 3GPP Draft; R2-2102928; 3GPP TSG-RAN WG2 Meeting #113bis-e; Electronic meeting, Apr. 2-13, 2020; XP052174498 (3 pages).
ESA: ,,Guiding framework on integrity concepts for A-GNSS positioning, 3GPP Draft; R2-2105985; 3GPP TSG RAN WG2 Meeting #114-e; Electronic meeting, May 19-May 27, 2021, XP052004012 (17 pages).

* cited by examiner

100

102 — core network external networks

⋯ backhaul 114

RAN₁

RAN₂

RANₙ

108₁  108₂

UE₁

UE₂ gNBs ← → core

116₂  gNB₂  114₂

106₂

112₂ 108₃  112₁

110₁

ANT

IoT  UE₃  IoT gNBs ← → gNBs ← → core

116₁  gNB₁  114₁  116₄  gNB₄  114₄

106₁  110₂  106₄ gNBs ← →

116₅  gNB₅  114₅

106₅

RANn gNBs ← →

116₃  gNB₃  114₃

106₃

LCS client

GMLC

LRF

Le

Le

Ngmlc

AF

Naf

UDM

Nudm

LMF
(N1)

Nlmf

UDR

Nudr

AMF

N1

N2

RAN

240

Namf

NEF

Nnef

Uu

UE

202

PC5

UE

204

GNSS satellite

UE

208

PC5

UE

206

PC5

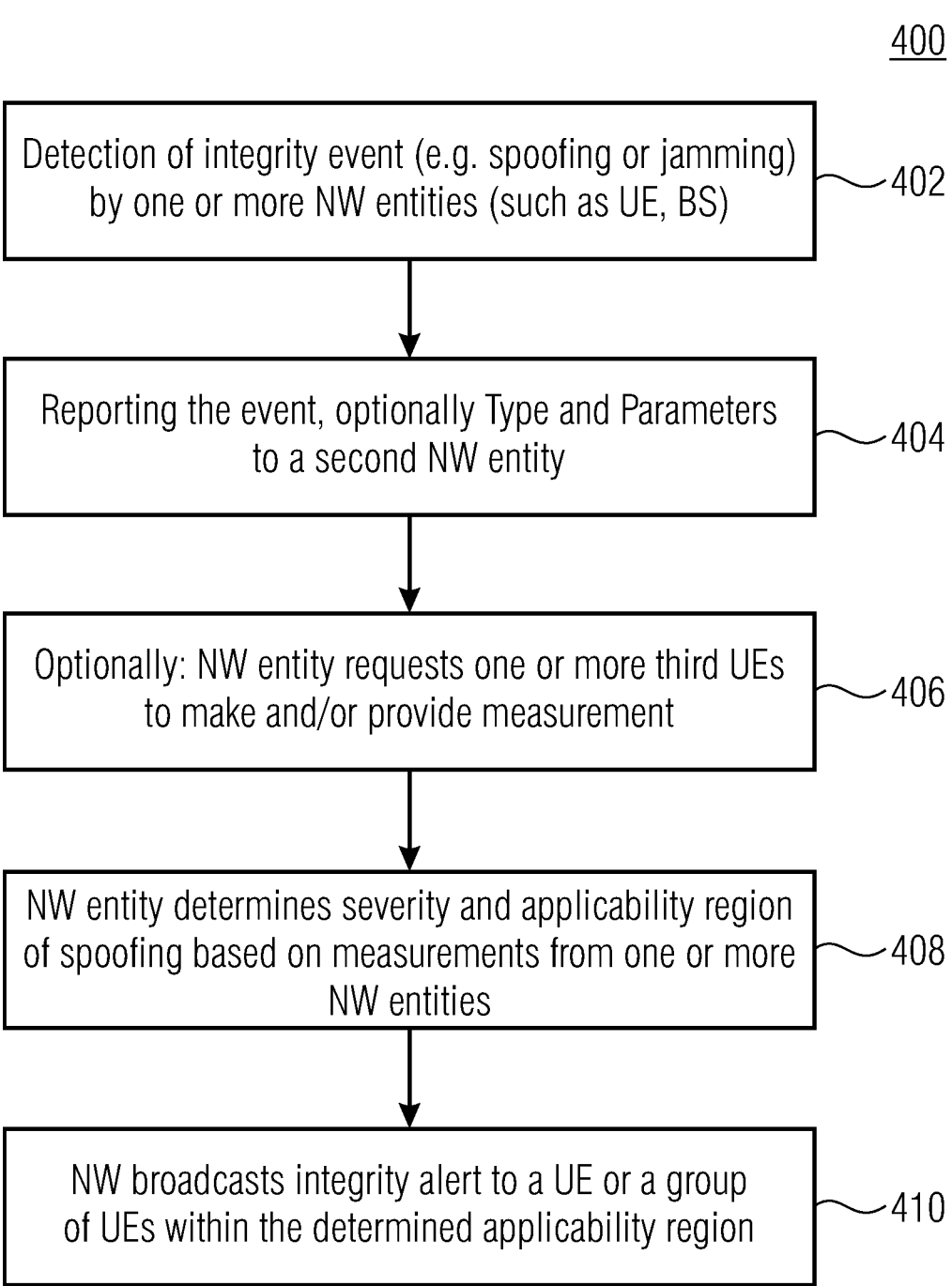

400

Detection of integrity event (e.g. spoofing or jamming) by one or more NW entities (such as UE, BS) — 402

Reporting the event, optionally Type and Parameters to a second NW entity — 404

Optionally: NW entity requests one or more third UEs to make and/or provide measurement — 406

NW entity determines severity and applicability region of spoofing based on measurements from one or more NW entities — 408

NW broadcasts integrity alert to a UE or a group of UEs within the determined applicability region — 410

Fig. 11

POSITIONING INTEGRITY IN WIRELESS NETWORKS

CROSS-REFERENCES TO RELATED APPLICATIONS

This application is a continuation of copending International Application No. PCT/EP2021/079110, filed Oct. 20, 2021, which is incorporated herein by reference in its entirety, and additionally claims priority from European Application No. EP 20 202 849.4, filed Oct. 20, 2020, which is incorporated herein by reference in its entirety.

Embodiments of the present application relate to the field of wireless communication, and more specifically, to positioning integrity in wireless networks.

BACKGROUND OF THE INVENTION

FIG. 1 is a schematic representation of an example of a terrestrial wireless network 100 including, as is shown in FIG. 1(a), a core network 102 and one or more radio access networks RAN1, RAN2, . . . RANN. FIG. 1(b) is a schematic representation of an example of a radio access network RANn that may include one or more base stations gNB1 to gNB5, each serving a specific area surrounding the base station schematically represented by respective cells 1061 to 1065. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the RANn may include more or less such cells, and RANn may also include only one base station. FIG. 1(b) shows two users UE1 and UE2, also referred to as user equipment, UE, that are in cell 1062 and that are served by base station gNB2. Another user UE3 is shown in cell 1064 which is served by base station gNB4. The arrows 1081, 1082 and 1083 schematically represent uplink/downlink connections for transmitting data from a user UE1, UE2 and UE3 to the base stations gNB2, gNB4 or for transmitting data from the base stations gNB2, gNB4 to the users UE1, UE2, UE3. Further, FIG. 1(b) shows two IoT devices 1101 and 1102 in cell 1064, which may be stationary or mobile devices. The IoT device 1101 accesses the wireless communication system via the base station gNB4 to receive and transmit data as schematically represented by arrow 1121. The IoT device 1102 accesses the wireless communication system via the user UE3 as is schematically represented by arrow 1122. The respective base station gNB1 to gNB5 may be connected to the core network 102, e.g., via the S1 interface, via respective backhaul links 1141 to 1145, which are schematically represented in FIG. 1(b) by the arrows pointing to "core". The core network 102 may be connected to one or more external networks. Further, some or all of the respective base station gNB1 to gNB5 may connected, e.g., via the S1 or X2 interface or the XN interface in NR, with each other via respective backhaul links 1161 to 1165, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB), the physical downlink shared channel (PDSCH) carrying for example a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels, or more precisely the transport channels according to 3GPP, may further include the physical random access channel (PRACH or RACH) used by UEs for accessing the network once a UE is synchronized and has obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g., 1 ms. Each subframe may include one or more slots of 12 or 14 OFDM symbols depending on the cyclic prefix (CP) length. All OFDM symbols may be used for DL or UL or only a subset, e.g., when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g., DFT-s-OFDM. Other waveforms, like non-orthogonal waveforms for multiple access, e.g., filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the NR (5G), New Radio, standard.

The wireless network or communication system depicted in FIG. 1 may by a heterogeneous network having distinct overlaid networks, e.g., a network of macro cells with each macro cell including a macro base station, like base station gNB1 to gNB5, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the NR (5G), new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs may not be connected to a base station, for example, they are not in an RRC connected state, so that the UEs do not receive from the base station any sidelink resource allocation configuration or assistance, and/or may be connected to the base station, but, for one or more reasons, the base station may not provide sidelink resource allocation configuration or assistance for the UEs, and/or may be connected to the base station that may not support NR V2X services, e.g., GSM, UMTS, LTE base stations.

When considering two UEs directly communicating with each other over the sidelink, e.g., using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present.

Naturally, it is also possible that the first vehicle 202 is covered by the gNB, i.e., connected with Uu to the gNB, wherein the second vehicle 204 is not covered by the gNB and only connected via the PC5 interface to the first vehicle 202, or that the second vehicle is connected via the PC5 interface to the first vehicle 202 but via Uu to another gNB, as will become clear from the discussion of FIGS. 4 and 5.

FIG. 4 is a schematic representation of a scenario in which two UEs directly communicating with each, wherein only one of the two UEs is connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204, wherein only the first vehicle 202 is in the coverage area 200 of the base station gNB. Both vehicles 202, 204 are connected directly with each other over the PC5 interface.

FIG. 5 is a schematic representation of a scenario in which two UEs directly communicating with each, wherein the two UEs are connected to different base stations. The first base station gNB1 has a coverage area that is schematically represented by the first circle 2001, wherein the second station gNB2 has a coverage area that is schematically represented by the second circle 2002. The UEs directly communicating with each other include a first vehicle 202 and a second vehicle 204, wherein the first vehicle 202 is in the coverage area 2001 of the first base station gNB1 and connected to the first base station gNB1 via the Uu interface, wherein the second vehicle 204 is in the coverage area 2002 of the second base station gNB2 and connected to the second base station gNB2 via the Uu interface.

The 3GPP family of mobile communication has specified several positioning methods in the Rel. 16 of the specifications, some of which use the radio signals from the mobile communication standards developed by 3GPP (RAT-dependent) and other use the signals from other signals, such as GNSS or sensors (RAT-independent). User position calculated using these methods may be used for diverse applications ranging from simple navigation to application such as autonomous driving, where safety-of-life is an important consideration and requires the positioning to reliable.

To be able to describe the interactions between the entities involved in positioning, the location services (LCS) architecture in 3GPP is represented either in reference point representation, where the interactions between network nodes is described by means of interface points between two network nodes, or it is represented by means of service based interface (SBI) representation.

The location services client (LCS client), which may reside either in the UE, in the network or in external networks, may request the location information pertaining to a particular UE or a group of UEs. The request for the location information is called location request, and this may be an immediate location request or it may be a deferred location request, depending on when the location information is to be provided. In the first type of location request, the LCS client would be provided the location of the UE as soon as the location information is available. In the second type of location request, the LCS client request a location of the UE at one or more points in future.

Likewise, there are also three types of location requests:

1) Mobile originated location request (MO-LR)—the UE initiates a location request and sends the request to the serving PLMN to initiate such location request.

2) Mobile terminated location request (MT-LR)—an LCS client or AF internal or external to the serving PLMN sends the location request. The external AF may send the request to the GMLC.

3) Network induced location request (NI-LR)—e.g. the serving AMF for the UE initiates location request of the UE corresponding to some regulatory service (e.g., emergency call from the UE)

The location management function (LMF) which is responsible for determining the UE position receives the request for location services from a second node, e.g., the access and mobility management function (AMF).

The following Table 1 provides an overview over the different positioning methods:

TABLE 1

| Method | UE-based | UE-assisted, LMF-based | NG-RAN node assisted | Remarks |
|---|---|---|---|---|
| 1 A-GNSS | Yes | Yes | No | RAT-independent |
| 2 OTDOA | No | Yes | No | Legacy E-UTRA positioning method |
| 3 E-CID | No | Yes | Yes | Legacy E-UTRA positioning method |
| 4 Sensor | Yes | Yes | No | RAT-independent |
| 5 WLAN | Yes | Yes | No | RAT-independent |
| 6 Bluetooth | No | Yes | No | RAT-independent |
| 7 TBS | Yes | Yes | No | RAT-independent |
| 8 DL-TDOA | Yes | Yes | No | Specified in Rel. 16 5G-NR |
| 9 DL-AoD | Yes | Yes | No | Specified in Rel. 16 5G-NR |
| 10 Multi-RTT | No | Yes | Yes | Specified in Rel. 16 5G-NR |
| 11 NR E-CID | No | Yes | Yes | Specified in Rel. 16 5G-NR |
| 12 UL-TDOA | No | No | Yes | Specified in Rel. 16 5G-NR |
| 13 UL-AoA | No | No | Yes | Specified in Rel. 16 5G-NR |

According to TS 38.305, the positioning methods fall into the following three categories:

1. Positioning methods (RAT-independent techniques), e.g., methods 1 and 4-7 in Table 1, based on external systems/sensors and network assistance: A-GNSS, Sensor, WLAN, Bluetooth, TBS.

2. Positioning methods from previous releases based on LTE signals, e.g., method 2-3 in Table 1, e.g., up to Rel-15: OTDOA, E-CID;

3. Positioning methods based on NR signals for Rel-16, e.g., methods 8-13 in Table 1: DL-TDOA, DL-AoD, Multi-RTT, NR E-CID, UL-TDOA, UL-AoA.

FIG. 6 is a schematic representation of the location services (LCS) architecture with core network components represented as reference point representation. As shown in FIG. 6, a first UE 202 can comprise a GNSS receiver for receiving signals from a GNSS satellite. The first UE 202 can be connected via a Uu interface to a radio access network (RAN) node 240, such as a gNB, and via a satellite 252 to a non-terrestrial networks (NTN) gateway 254. The first UE 202 can be connected to a location management function LMF and an access and mobility management function AMF. Also the RAN node 240 can be connected to the AMF. The AMF can be connected to the LMF and via a gateway mobile location center GMLC to an LCS client. A second UE 204 can comprise a GNSS receiver for receiving signals from a GNSS satellite, wherein the second UE 204 can be connected via the sidelink (PC5) to the first UE 202. Third and fourth UEs 206 and 208 can comprise GNSS receivers for receiving signals from a GNSS satellite, wherein third and fourth UEs 206 and 208 can be out of network coverage.

FIG. 7 is a schematic representation of the location services (LCS) architecture with core network components represented as service based interface representation. As shown in FIG. 7, a first UE 202 can be connected via a Uu interface to a RAN node 240 and to AMF. Also the RAN node 240 can be connected to the AMF. The AMF can be connected to the LMF and via an GMLC to an LCS client. A second UE 204 can be connected via the sidelink (PC5) to the first UE 202. Third and fourth UEs 206 and 208 can be connected to each other via the sidelink (PC5).

The performance of a positioning system may be described using different characteristics:

1. Accuracy—which addresses how often the computed position deviates from the true position of the UE. For example, a positioning system could have an accuracy of better than 1 meter for 90% of all users.

2. Integrity—which describes the trust that can be placed on the quality of the location information provided by the positioning system. As in the above example, the positioning accuracy is better than 1 m for 90% of all cases, but for the remaining 10% the error could be unbounded. The aim of introducing accuracy is to ensure that the client of location system information is issued timely warnings when the error exceeds a certain tolerated threshold.

3. Availability—which describes how often the positioning system is available and delivers location information corresponding to the required quality of services.

GNSS signals when received by a user close to Earth's surface are weak. They are susceptible to interference (jamming) and fake signals (spoofing). Some high-end GNSS devices are capable of detecting such events or detecting it better than some low-end GNSS devices. Likewise, the intelligence gathered over several entities, for example monitoring BS, moving UEs, stationary UEs, UEs equipped with sensors etc. can be combined together to intelligently determine the area over which the integrity alert is to be raised.

The interferences and/or jammers and/or spoofers may be stationary but they may also be moving. The moving interferences and/or jammers and/or spoofers pose a particular problem that the area within the cellular network that is affected by integrity event changes dynamically. Furthermore, the area impacted by interference and/or jammer and/or spoofer may be limited in size. Therefore, the network infrastructure entities (for example, base stations) may not detect the interferences and/or jamming and spoofing signals but the mobile units may actually detect them. A key issue is to combine the information from multiple UEs and/or BSs, databases and so forth, so that integrity alert can be provided to other UEs which may or may not have the capability to detect and locate integrity events.

Integrity of the positioning computation is important for many application.

Integrity of GNSS-based positioning data has been in use for navigation and landing in civil aviation context. The integrity is either computed at the receiver, for example, using the receiver autonomous integrity monitoring (RAIM) or Aircraft Autonomous Integrity Monitoring (AAIM) or Advanced RAIM (ARAIM) methods or it may be made available to the receiver through the network through space-based augmentation systems (SBAS). The user device may be able to detect integrity events for example by utilizing more pseudorange measurements from satellite than necessary to obtain a positioning. Techniques such as power monitoring and spectrum monitoring can detect jamming and spoofing, but may not directly determine the impact on navigation performance. Alternatively, the user device may be able to make use of measurement from simple inertial sensors or inertial navigation sensors (INS) measurements to detect and/or correct the integrity issues. Advanced high-end receivers can also use multiple antennas with direction of arrival estimation and null-steering to detect and mitigate spoofing or jamming events. Techniques to detect fault on their own are beyond the scope of this invention, but how the detected techniques are utilized by a wireless network to enhance integrity of positioning solution is part of the embodiments of this invention.

On the other hand, there exist monitoring systems such as space based augmentation system (SBAS) that provide differential corrections and integrity messages for GNSS satellites that are within the sight of monitoring stations that are distributed within the concerned area, for example, within the continent.

The above solutions are primarily GNSS-based and are not integrated into a 5G network. To address these issues, the 3GPP specified PPP-RTK corrections to be provided to the UE and also specified the state space representation (SSR). The PPP-RTK consists of measuring the total error at a monitoring station and applying the correction to the nearby UE, whereas the SSR consists of splitting the errors within the receiver into its component parts and updating the component as and when it is needed. For example: the error due to orbit, clock, bias may have global scope, whereas the error due to propagation through ionosphere and troposphere may have a local scope. The 3GPP system in its current form only supports integrity by signaling the ID of space vehicle with bad signal or bad signals. In 3GPP cellular system, the information element (IE) GNSS-RealTimeIntegrity is used to signal the ID of the space vehicle with bad signal or bad signals. It further allows the location server to signal the UE that certain combination of signals from the satellite are not healthy.

Integrity of a positioning solution also depends on the interferers and/or spoofers in the vicinity of the receiver and identifying and notifying it through the network is not specified in the standards.

Starting from the above, there is a need for improvements or enhancements with respect to integrity of positioning.

It is noted that the information in the above section is only for enhancing the understanding of the background of the invention and therefore it may contain information that does not form conventional technology and is already known to a person of ordinary skill in the art.

SUMMARY

An embodiment may have a first apparatus, comprising: a GNSS receiver configured to receive GNSS signals, a mobile communication transceiver configured to operate in a mobile communication network, wherein the first apparatus is configured to determine at least one parameter based on the received GNSS signals or use at least one parameter determined by a second or third apparatus based on GNSS measurements, wherein the first apparatus is configured to receive with the mobile communication transceiver an information message from a second apparatus or a third apparatus of the mobile communication network, the information message comprising an integrity information describing an integrity status of the GNSS signals, wherein the first apparatus is configured to determine the at least one parameter in dependence on the integrity information, and report the at least one parameter taking into account the integrity information, wherein the report of the at least one parameter comprises a quality and uncertainty.

Another embodiment may have a second apparatus, comprising: a mobile communication transceiver configured to operate in a mobile communication network, wherein the second apparatus is configured to transmit with the mobile communication transceiver an information message to a first apparatus or a group of first apparatuses of the mobile communication network, the information message comprising an integrity information describing an integrity status of the GNSS signals in a geographical or logical area in which the first apparatus or group of first apparatuses is located, wherein the second apparatus is configured to receive a report of at least one parameter from the first apparatus, wherein the at least one parameter is determined by the first apparatus based on GNSS signals received by the first apparatus and in dependence on the integrity information, wherein the report of the at least one parameter comprises a quality and uncertainty.

Another embodiment may have a method for operating a first apparatus, the method comprising: receiving GNSS signals, operating in a mobile communication network, determining at least one parameter based on the received GNSS signals, receiving an information message from a second apparatus or a third apparatus of the mobile communication network, the information message comprising an integrity information describing an integrity status of the GNSS signals, and determining the at least one parameter in dependence on the integrity information and reporting the at least one parameter taking into account the integrity information, wherein the report of the at least one parameter comprises a quality and uncertainty.

Another embodiment may have a method for operating a second apparatus, the method comprising: operating in a mobile communication network, transmitting an information message to a first apparatus or a group of first apparatuses of the mobile communication network, the information message comprising an integrity information describing an integrity status of the GNSS signals in a geographical or logical area in which the first apparatus or group of first apparatuses is located.

BRIEF DESCRIPTION OF THE DRAWINGS

Embodiments of the present invention will be detailed subsequently referring to the appended drawings, in which:

FIG. 9 shows a schematic representation of a 3GPP network with different network entities a UE can connect with;

FIG. 11 is a flowchart of a method 400 for detecting an integrity event in a network and communicating same to a network entity;

DETAILED DESCRIPTION OF THE INVENTION

Figures 1A, 1B:
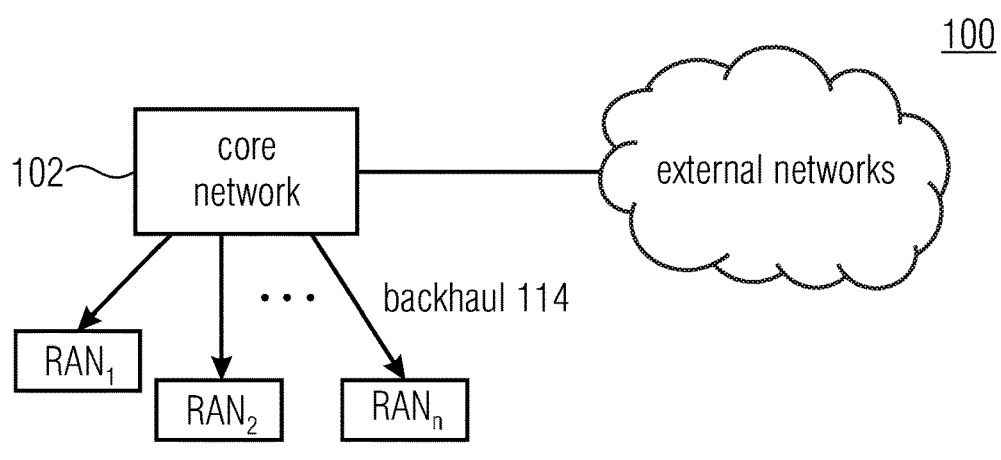
FIG. 1a-b is a schematic representation of an example of a wireless communication system.
Figure 2:
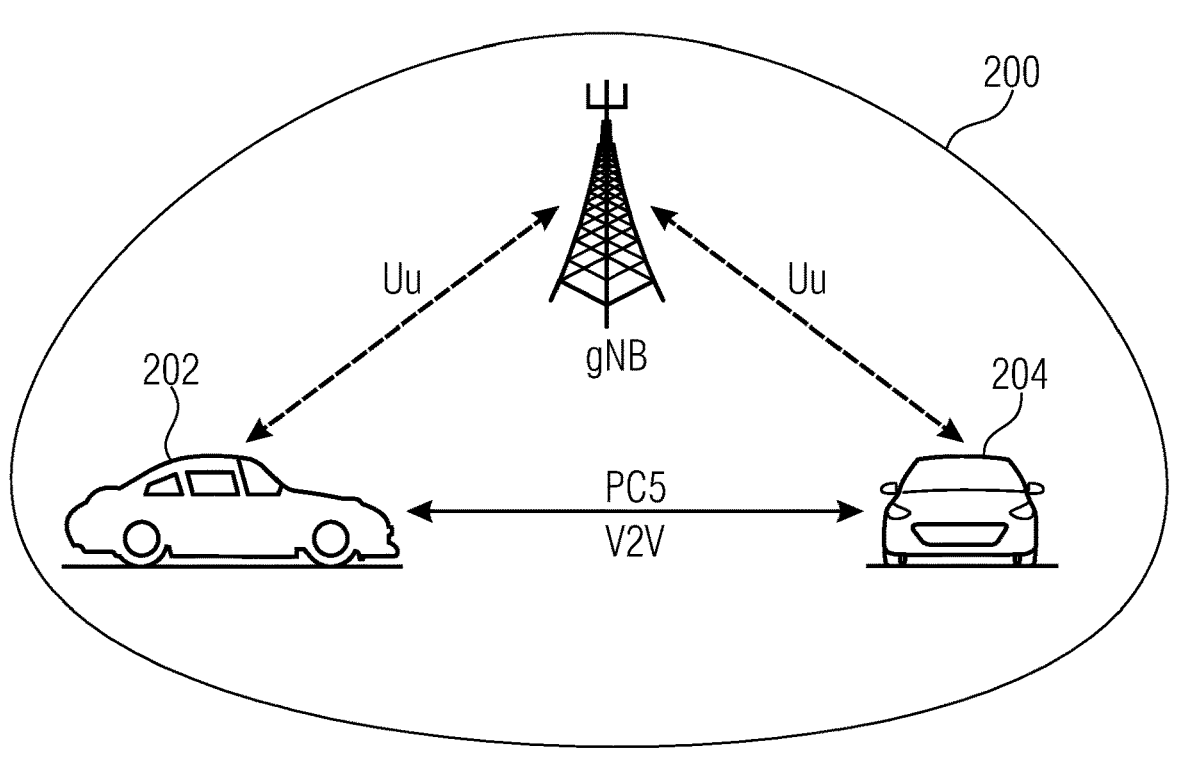
FIG. 2 is a schematic representation of an in-coverage scenario in which UEs directly communicating with each other are connected to a base station.
Figure 3:
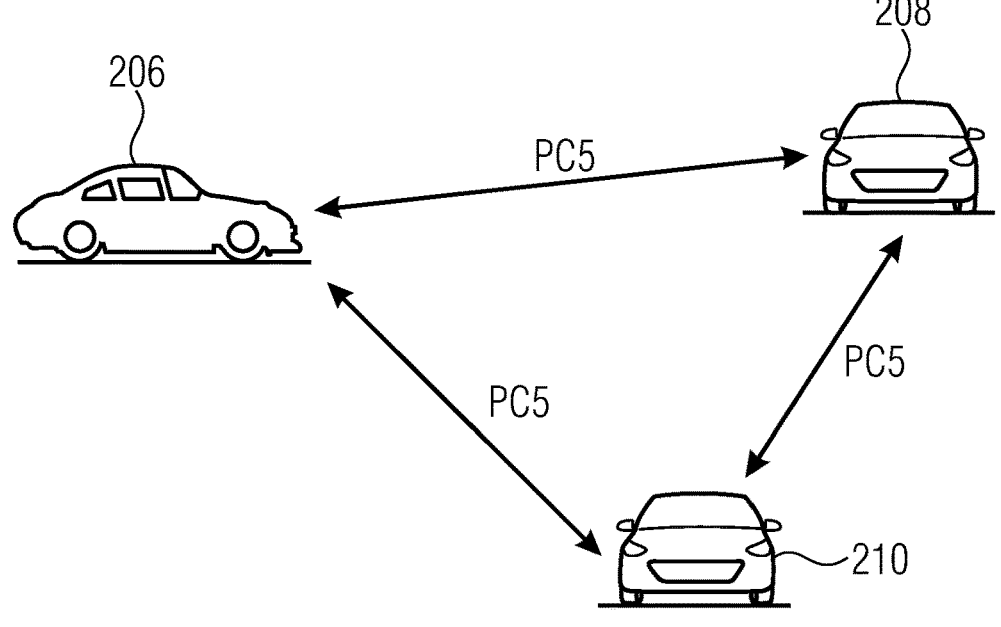
FIG. 3 is a schematic representation of an out-of-coverage scenario in which UEs directly communicating with each other receive no SL resource allocation configuration or assistance from a base station.
Figure 4:
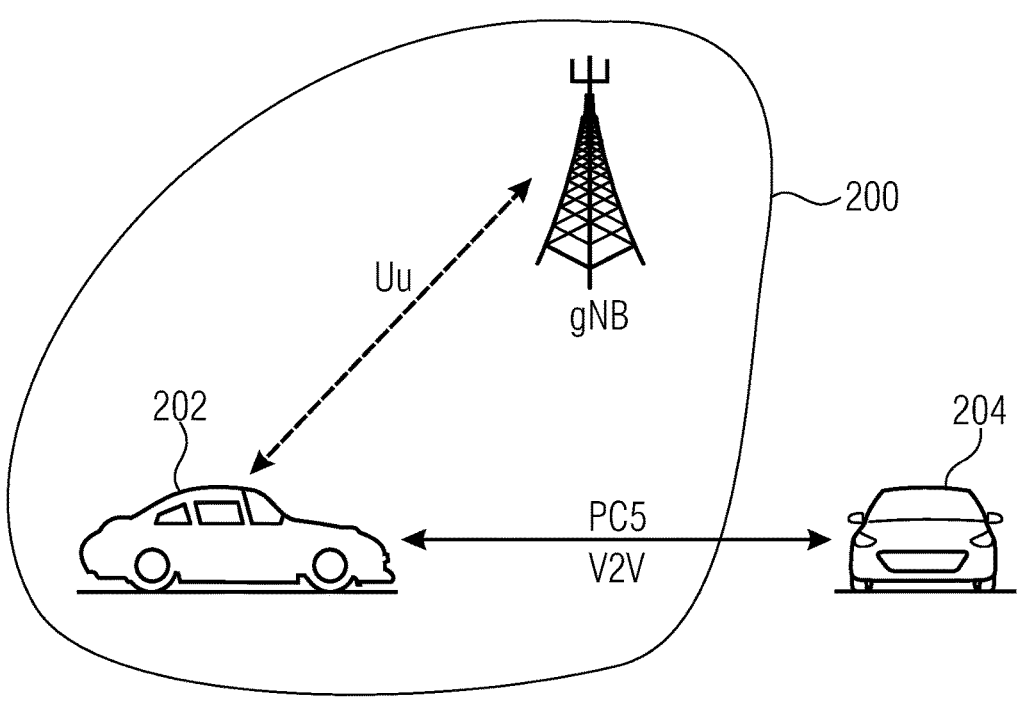
FIG. 4 is a schematic representation of a partial out-of-coverage scenario in which some of the UEs directly communicating with each other receive no SL resource allocation configuration or assistance from a base station.
Figure 5:
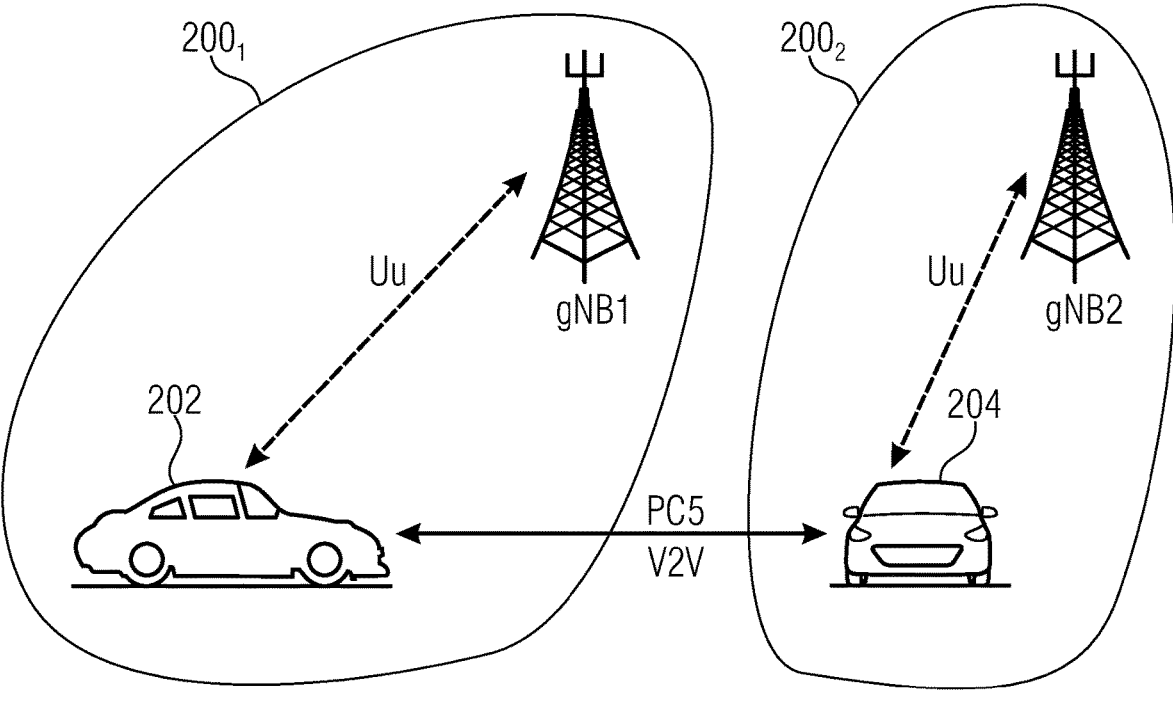
FIG. 5 is a schematic representation of an in-coverage scenario in which UEs directly communicating with each other are connected to different base stations.
Figure 6:
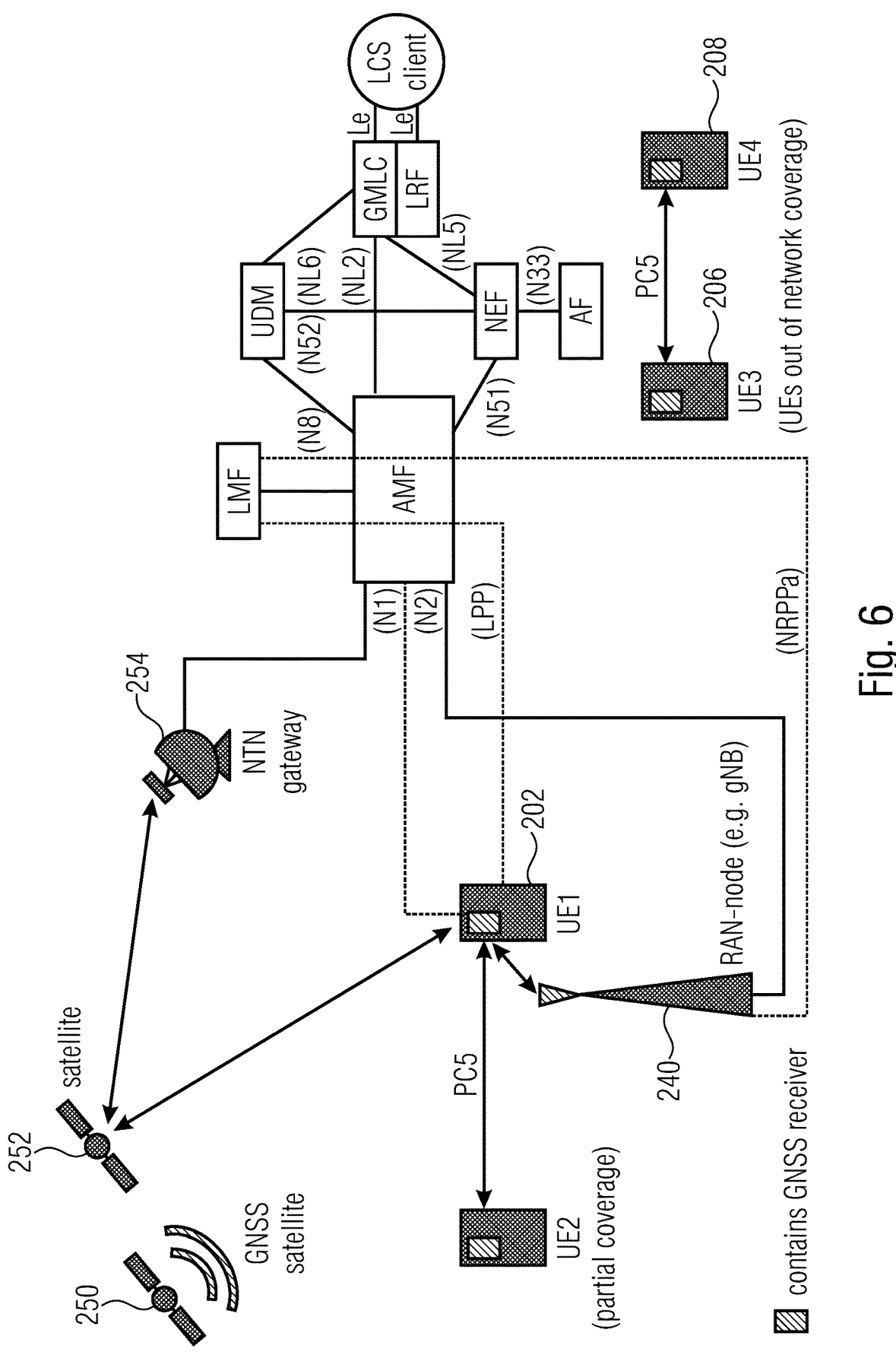
FIG. 6 is a schematic representation of the location services (LCS) architecture with core network components represented as reference point representation.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

As indicated above, integrity of the positioning computation is important for many application. The measurement on signals may be disturbed by external events or due to UE-specific issues. In accordance with some embodiments, cooperative sensing from multiple UEs and network elements can be used to (1) collect integrity faults at different location in the network based on reporting from UEs and NW elements, (2) analyze the severity and scope of the integrity fault, (3) determine UE or a group of UEs that need to be informed of the integrity fault and/or (4) provide a fast mechanism to alert the UE of the integrity fault.

In particular, in embodiments, the integrity fault is alerted to the UE within the limits needed for the use case.

The integrity of a positioning system may be described by one or more of the following parameters:

A first parameter is the Target Integrity Risk (TIR). The TIR describes the probability that the positioning error exceeds the Alert Limit (AL) without warning the user within the required Time-to-Alert (TTA). The TIR is usually defined as a probability rate per unit time.

A second parameter is the Alert Limit (AL). The AL describes the maximum allowable positioning error such that the positioning system is available for the intended application. If the positioning error is beyond the AL, operations are hazardous and ideally the positioning system should be declared unavailable for the intended application to prevent loss of integrity. The alert limit may be a 3D-alert limit or may be described by alert limit on horizontal plane and/or on the vertical axis. This may be called horizontal alert limit (HAL) or vertical alert limit (VAL) respectively.

A third parameter is the Time-to-Alert (TTA). The TTA describes the maximum allowable elapsed time from when the positioning error exceeds the Alert Limit (AL) until the function providing position integrity annunciates a corresponding alert.

A fourth parameter is the Protection Level (PL). The PL is a statistical upper-bound of the positioning error that ensures that, the probability per unit of time of the true error being greater than the AL and the PL being less than or equal to the AL, for longer than the TTA, is less than the required TIR. Similar to alert limit, the protection level may be specified for a 3D or for one or more of the components (e.g., horizontal protection limit and/or vertical protection limit).

The parameters target integrity risk (TIR), alert limit (AL), time to alert (TTA) may map to one of the positioning service levels, depending on the integrity assurance needed by the system. The quality and confidence of the measurement (e.g., the protection level) computed either by the UE and/or by the network element may be used to determine whether the system is available or not. Alternatively, the quality and confidence of the measurement may be determined by whether there are any integrity alerts (for example, the presence of interference, spoofing, jamming, multipath) and so on raised by the UE or the NW. For example, detection of spoofing, interference on certain frequency and/or on some GNSS constellation may trigger the system to take alternative positioning methods for the required positioning integrity assurance.

The present invention provides approaches for improving positioning integrity.

Figure 8:
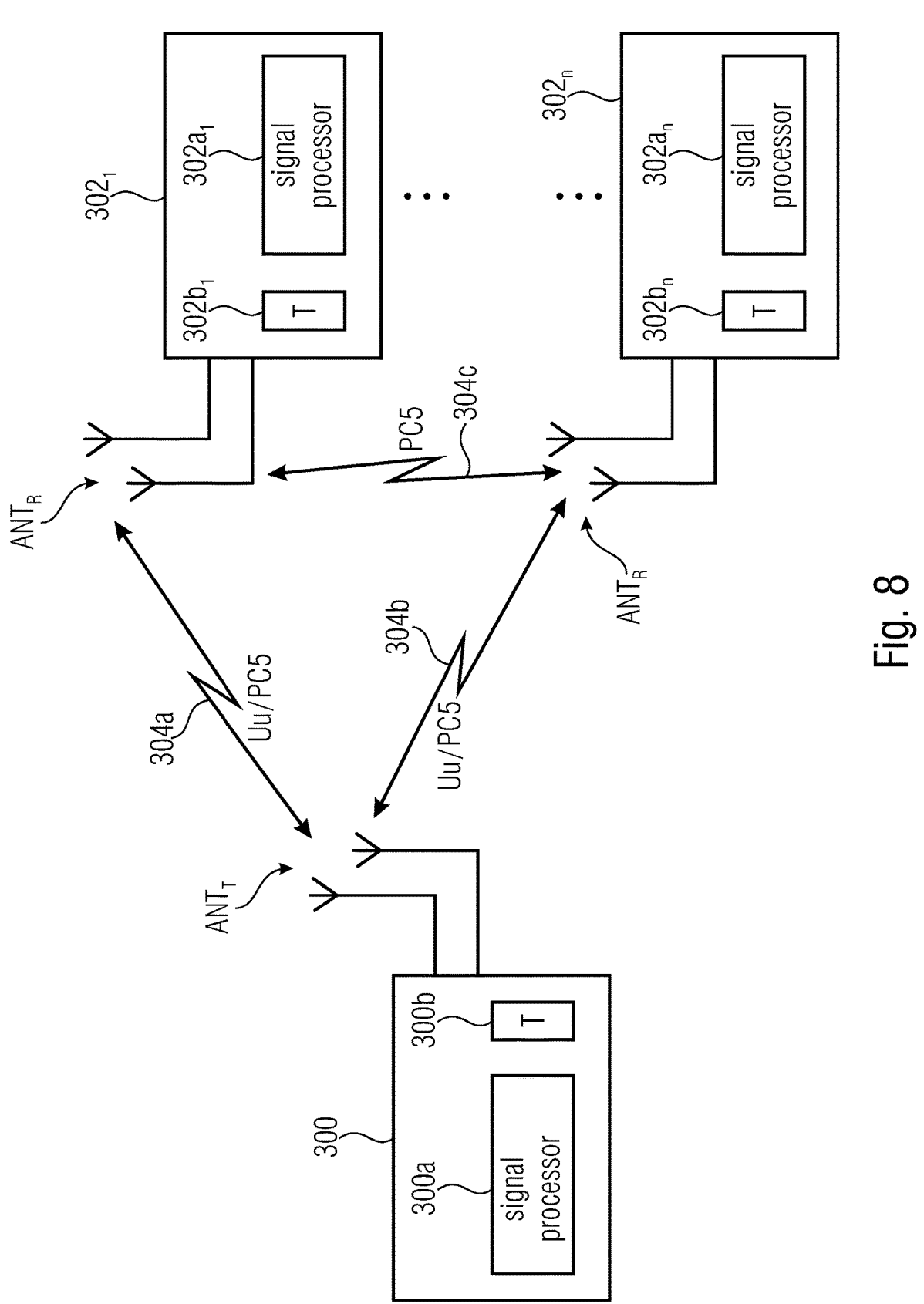
FIG. 8 is a schematic representation of a wireless communication system comprising a transceiver, like a base station or a relay, and a plurality of communication devices, like UEs, according to an embodiment.

Embodiments of the present invention may be implemented in a wireless communication system as depicted in FIGS. 1-5 including base stations and users, like mobile terminals or IoT devices. FIG. 8 is a schematic representation of a wireless communication system including a central transceiver, like a base station, and one or more transceivers $302_1$ to $302n$, like user devices, UEs. The central transceiver 300 and the transceivers 302 may communicate via one or more wireless communication links or channels 304a, 304b, 304c, like a radio link. The central transceiver 300 may include one or more antennas ANTT or an antenna array having a plurality of antenna elements, a signal processor 300a and a transceiver unit 300b, coupled with each other. The transceivers 302 include one or more antennas ANTR or an antenna array having a plurality of antennas, a signal processor $302a_1$, $302a_n$, and a transceiver unit $302b_1$, $302b_n$, coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs and the base stations may operate in accordance with the inventive teachings described herein.

Embodiments provide a first apparatus [e.g., mobile UE], comprising: a GNSS receiver configured to receive GNSS signals, a mobile communication transceiver [e.g., RAT transceiver; e.g., 5G/NR transceiver] configured to operate in a mobile communication network, wherein the first apparatus is configured to determine at least one parameter [e.g., position and/or velocity and/or system time and/or GNSS measurements] based on the received GNSS signals or use at least one parameter [e.g., the system time] determined by a second or third apparatus [e.g., NW-entity or a UE] based on GNSS measurements, wherein the first apparatus is configured to receive with the mobile communication transceiver an information message from a second apparatus or a third apparatus of the mobile communication network, the information message comprising an integrity information [e.g., flag, one or more bits] describing an integrity status [e.g., disturbed or normal] of the GNSS signals [e.g., in a geographical or logical area the apparatus is located] [e.g., describing whether the GNSS signals are disturbed [e.g., spoofed or jammed], wherein the first apparatus is configured to at least one out of determine the at least one parameter in dependence on the integrity information,
  report the at least one parameter taking into account the integrity information,
  take a specific action in dependence on the integrity information.

In embodiments, the at least one parameter is at least one out of
  a position of the first apparatus,
  a velocity of the first apparatus,
  a system time,
  GNSS measurements.

In embodiments, the first apparatus is configured to determine [e.g., derive] the at least one parameter further based on measurements from at least one out of the following
  radio signals (according to NR, LTE, WLAN, Bluetooth, Zigbee, UWB, radar),
  IMU,
  accelerometer,
  gyroscope,
  barometer,
  pedometer,
  tachometer,
  odometer,
  speedometer,
  magnetometer,
  camera,
  lidar.

In embodiments, the integrity information describes the integrity status of the GNSS signals in a geographical [e.g., local or global coordinates] or logical area [e.g., cell ID, tracking area ID, zone ID] the apparatus is located.

In embodiments, the integrity status is at least one out of
  an integrity event [e.g., spoofed, jammed, interfered, system outage],
  an integrity alert.

In embodiments, the first apparatus is configured to report measurements relevant for integrity [e.g., interference type, position, time, raw measurements, snapshot of data or movement model] to the second apparatus [e.g., LMF via gNB, NTN (satellite links)].

For example, the first apparatus [e.g., UE] can be configured to report a position and/or time together with raw measurements to the second apparatus [e.g., NW] and the second apparatus sends the received position and the raw measurements to a secure PRS (public regulated services) positioning server in order to validate and/or authenticate the received position and the raw measurements. Thereby, this information can be sent via NTN (satellites) or via (UE-sidelink and then satellite).

In embodiments, the integrity information is at least one out of
  a flag,
  one or more bits,
  several bits signaling the integrity status of each GNSS system and/or frequency bands and/or GNSS signal,
  confidence and/or quality of integrity information,
  prediction of integrity information in the next area,
  a quality indicator.

In embodiments, the quality indicator is a protection level.

In embodiments, the protection level describes the maximum likely position error with respect to a specified degree of confidence.

In embodiments, the information message further comprises a correction information, wherein the first apparatus is configured to determine the at least one parameter in dependence on the correction information.

In embodiments, the first apparatus is configured to receive the information message from the second apparatus via a downlink channel, or wherein the first apparatus is configured to receive the information message from the third apparatus via a sidelink channel or a downlink channel.

In embodiments, the information message is transmitted using a using a location positioning protocol, LPP, provide message.

In embodiments, the parameter is the system time and the first apparatus is configured to use the GNSS signals as Level 1 source for determining UE Reftime, wherein the specific action includes prioritizing Level 4, Level 5 or Level 6 synchronization sources over Level 1, Level 2 or Level 3 synchronization sources for sidelink synchronization reference priorities [e.g., if the integrity information indicates that the GNSS signals are disturbed].

In embodiments, the first apparatus is configured to receive a configuration message from the second and/or third apparatus, wherein the first apparatus is configured to take the specific action defined by the configuration message.

In embodiments, the specific action includes one out of using an alternative positioning method, using measurements from other sources [e.g., other radio signal measurements or measurements from other sensors [e.g., such as IMU, accelerometer, gyroscope, barometer], excluding at least the affected satellite signal on at least the affected frequency or frequency band or GNSS system, relying on measurement of at least one satellite signal outside the affected frequency or frequency band, fusing the received integrity information with integrity information determined by the UE itself, forwarding the received message towards the second apparatus [e.g., NW] when received from a third apparatus in partial or out of coverage scenario.

In embodiments, the first apparatus is a UE.

Further embodiments provide a second apparatus [e.g., network entity, such as base station, LMF, NG-RAN node, local LMF functionality in NG-RAN node, TRP, AMF, NRF, external servers accessing the network via NRF or gateways, RSU, NTN RAN with transparent payload or NTN RAN with regenerative payload], comprising: a mobile communication transceiver [e.g., RAT transceiver; e.g., 5G/NR transceiver] configured to operate in a mobile communication network, wherein the second apparatus is configured to transmit with the mobile communication transceiver an information message to a first apparatus or a group of first apparatuses of the mobile communication network, the information message comprising an integrity information describing an integrity status [e.g., disturbed [e.g., spoofed or jammed] or normal] of the GNSS signals in a geographical or logical area in which the first apparatus or group of first apparatuses is located [e.g., describing whether the GNSS signals are disturbed].

In embodiments, the second apparatus comprises a GNSS receiver or another receiver capable of detecting an integrity status [e.g., disturbed [e.g., jammed or spoofed] or normal [e.g., not jammed or spoofed] of GNSS signals, wherein the second apparatus is configured to determine with the GNSS receiver or the other receiver an integrity status of the GNSS signals and to derive the integrity information from the determined status.

In embodiments, the second apparatus is configured to receive from a third apparatus a third information message, the third information message comprising a reported position and/or time of the third apparatus, and a portion of GNSS signals received by the third apparatus [e.g., a Galileo PRS signal or Galileo OS signal] or measurements of the GNSS signals received by the third apparatus, wherein the second apparatus is configured to determine the integrity status of the GNSS signals based on the reported position of the third apparatus, and the portion of GNSS signals received by the third apparatus [e.g., a Galileo PRS signal or Galileo OS signal] or the measurements of the GNSS signals received by the third apparatus.

In embodiments, the integrity status is at least one out of an integrity event [e.g., spoofed, jammed or interfered], an integrity alert.

In embodiments, the information message is a first information message, wherein the integrity information is a first integrity information, wherein the second apparatus is configured to receive from a third apparatus a second information message comprising a second integrity information describing the integrity status of the GNSS signals in the geographical or logical area in which first apparatus is located, wherein the first integrity information transmitted with the first information message is based on the second integrity information.

In embodiments, the second apparatus is configured to transmit an integrity information request message to the third apparatus, the integrity information request message requesting the third apparatus to transmit the second information message comprising the second integrity information.

In embodiments, the second apparatus is configured to transmit the integrity information request message using location positioning protocol, LPP, request message.

In embodiments, the second information message is transmitted using a location positioning protocol, LPP, provide message.

In embodiments, the second apparatus is configured to transmit the second integrity information as the first integrity information with the first information message [e.g., first integrity information is equal to the second integrity information], or wherein the apparatus is configured to derive the first integrity information from the second integrity information.

In embodiments, the second apparatus is configured to receive from a group of third apparatuses a group of second information messages comprising second integrity information, each describing the integrity status of the GNSS signals, wherein the second apparatus is configured to derive the first integrity information from the group of second integrity information.

In embodiments, the second apparatus is configured to detect an integrity event or integrity alert based on the second information message or group of second information messages.

In embodiments, the second apparatus is configured to determine a severity of the integrity event or integrity alert, and an applicability region of integrity event or integrity alert based on the second information message or group of second information messages.

In embodiments, the second apparatus is configured, in case of the integrity event or integrity alert, to transmit a configuration message to the first apparatus, wherein the configuration message is configured to control the first apparatus to take a specific action.

In embodiments, the second apparatus is one out of the following:

a base station, an LMF, an NG-RAN node, a local LMF functionality in a NG-RAN node, a TRP, an AMF, an NRF, an external server accessing the mobile communication network via a NRF or a gateway, an NG-RAN node based on transparent satellite, an NG-RAN node based on regenerative satellite with or without inter-satellite link.

In embodiments, the second apparatus is configured to transmit the information message to the first apparatus via a different second apparatus [e.g., a regenerative satellite sending this information to another satellite over the inter-satellite links (ISL)].

Further embodiments provide a third apparatus [e.g. base station, UE, TRP] comprising: a mobile communication transceiver [e.g., RAT transceiver; e.g., 5G/NR transceiver] configured to operate in a mobile communication network, a GNSS receiver configured to receive GNSS signals, wherein the third apparatus is configured to determine an integrity status [e.g., detect an integrity fault and/or an integrity event] of the GNSS signals, wherein the third apparatus is configured to transmit with the mobile communication transceiver a second information message to a second apparatus or a first apparatus of the mobile communication network, wherein the second information message comprises an integrity information describing the integrity status of the GNSS signals.

In embodiments, the third apparatus is configured to transmit a third information message to the second apparatus [e.g., in response to a request from the second apparatus], the third information message comprising a portion of the received GNSS signals [e.g., Galileo OS signal/Galileo PRS signal] or measurements of the received GNSS signals, together with a position determined based on the received GNSS signals to the third apparatus [e.g., in order to enable the second apparatus to determine the integrity status of the GNSS signals].

For example, the second apparatus [e.g., NW] might tell the third apparatus [e.g., UE] to report the received signal portion (for example, the Galileo OS signal/Galileo PRS signal) or measurement, together with the computed position and the UE reports this part back to the second apparatus [e.g., NW]. This measured signal is used to calculate the integrity information at the second apparatus [e.g., NW or an external PRS server (through the network/gateway)].

In embodiments, the third apparatus comprises at least one additional sensor, wherein the at least one additional sensor is at least one out of the following sensors:

an inertial measurement unit (IMU),
and accelerometer,
a barometer,
a gyroscope,
a pedometer,
a tachometer,
a photodetector,
an odometer,
speedometer,
a magnetometer,
a camera,
a lidar.

wherein the third apparatus is configured to determine the integrity status using the at least one additional sensor.

In embodiments, the third apparatus is configured to determine the integrity status based on a comparison between a first time obtained from a time source of the mobile communication network and a second time obtained based on the received GNSS signals.

For example, the third apparatus [e.g., integrity detection device] can be configured to compare its second time source (for example LTE timing or 5G timing) with the time obtained from GNSS, and detect the integrity event based on the difference on the two timing.

In embodiments, the third apparatus is configured to report to the second apparatus capabilities of determining an integrity status of GNSS signals autonomously and/or on request.

In embodiments, the third apparatus is configured to report the capabilities of determining the integrity status of GNSS signals to the second apparatus in response to receiving a reporting capabilities request message from the second apparatus.

In embodiments, the reporting capabilities request message is transmitted using a location positioning protocol, LPP, request message.

In embodiments, the third apparatus is configured to report the capabilities of determining the integrity status of GNSS signals to the second apparatus using a location positioning protocol, LPP, provide message.

As an example, the network entity may use the LPP message RequestCapabilities to request the capability of the third apparatus to support GNSS positioning integrity support and the third apparatus (e.g., UE) may use the LPP message ProvideCapabilities to signal the GNSS positioning integrity support supported by the third apparatus (e.g., UE).

In embodiments, the integrity information describes the integrity status of the GNSS signals in a geographical or logical area [e.g., cell ID, tracking area ID, zone ID] the apparatus is located.

In embodiments, the integrity status is at least one out of an integrity event [e.g., spoofed, jammed, interfered], an integrity alert.

In embodiments, the third apparatus is configured to transmit the second information message comprising the integrity information in response to receiving an integrity information request message from the second apparatus.

In embodiments, the integrity information request message is transmitted using location positioning protocol, LPP, request message.

In embodiments, the third apparatus is configured to transmit the second information message comprising the integrity information using a location positioning protocol, LPP, provide message.

The following example describes how an integrity event may be signaled to the second apparatus. The network entity may use the LPP message RequestLocationInformation to request the integrity information from the third apparatus regarding positioning integrity measurements and the UE may use the LPP message ProvideLocationInformation to provide the integrity parameters and results.

One way to report detection of jamming, interference and/or spoofing is to report the integrity events (jamming and/or spoofing and/or interference) by describing it as a field consisting of integrityErrorCauses within the GNSS-IntegrityError. This shows one of multiple possibilities of reporting the integrity events. In this example, the integrity event is being reported as an error, because the UE may for example not be able to reliably estimate its position. Thereby, in the below examples, elements being highlighted in yellow may be provided, modified or changed according to the inventive approach described herein. Further IEs containing information described in this invention may be additionally added to the IEs described below.

```
GNSS-IntegrityError-r17::= SEQUENCE {
    measurementReferenceTime            MeasurementReferenceTime
       lastKnownPosition
    EllipsoidPointWithAltitudeAndUncertaintyEllipsoid,    -- Cond UEB
       integrityErrorCauses             ENUMERATED {spoofing,
    interference, jamming,. . .},
       gnss-SignalID-r17                GNSS-SignalID     OPTIONAL
       sv-id-r17                        SV-ID             OPTIONAL
}
``` wherein the lastKnownPosition may be the position of the UE last reliably known or this may be determined by the network by other means (for example using the E-CID). The issue observed with a particular GNSS signal from a certain GNSS constellation may be signaled and the problem detected with this signal may be signaled as spoofing, interference or jamming.

The GNSS-IntegrityError-r17 may be carried by the message IE A-GNSS-Error is used by the location server or target device to provide GNSS error reasons.

```
-- ASN1START
A-GNSS-Error ::= CHOICE {
    locationServerErrorCauses       GNSS-LocationServerErrorCauses,
    targetDeviceErrorCauses         GNSS-TargetDeviceErrorCauses,
    . . .,
    integrityError-17               GNSS-IntegrityError-r17
}
-- ASN1STOP
```

Finally, this message may be embedded within the IE A-GNSS-ProvideLocationInformation is used by the target device to provide location measurements (e.g., pseudo-ranges, location estimate, velocity) to the location server, together with time information. It may also be used to provide GNSS positioning specific error reason.

```
-- ASN1START
A-GNSS-ProvideLocationInformation ::= SEQUENCE {
    gnss-SignalMeasurementInformation GNSS-
SignalMeasurementInformation         OPTIONAL,
    gnss-LocationInformation             GNSS-LocationInformation
    OPTIONAL,
    gnss-Error                           A-GNSS-Error
    OPTIONAL,
    . . .
}
-- ASN1STOP
```

Alternatively, the information regarding spoofing, jamming, interference, multipath could also be added to the field GNSS-SignalMeasurementInformation. This may be the situation when the receiver has been able to estimate its location but at the same time has also been able to detect and characterize the integrity event. The added IE may contain GNSS integrity events such as multipath, jamming, spoofing, interference and optionally further IEs to describe the integrity events, such as type of measurement values, such as received signal strength indicator (RSSI), IEs describing the multipath profile, such as multipath delays values, signal strength of dominant path, signal strength of one or more multipath components, and other statistical parameters. Furthermore, optional information on last known location may be reported by the UE with its uncertainty, e.g. an ellipsoid point with a circle around it or a 3D coordinate in local coordinates with error margin.

This information may further be embedded into the ProvideLocationInformation.

Likewise, the integrity alert may be carried in the message "ProvideAssistanceData" and may be requested by "RequestAssistanceData" or be carried as part of a positioning SIB.

In embodiments, the integrity information further comprises parameters/characteristics describing the integrity status [e.g., interference type, position, time, raw measurements, snapshot of data or movement model].

In embodiments, the third apparatus is configured to report measurements relevant for integrity [e.g., interference type, position, time, raw measurements, snapshot of data or movement model] to the second apparatus [e.g., LMF via gNB, NTN (satellite links)].

In embodiments, the integrity information is one out of a flag, one or more bits.

several bits signaling the integrity status of each GNSS system and/or frequency bands and/or GNSS signal, confidence and/or quality of integrity information, prediction of integrity information in the next area, a quality indicator.

In embodiments, the quality indicator is a protection level.

In embodiments, the protection level describes the maximum likely position error with respect to a specified degree of confidence An example of the quality indicator may be the protection level computed by the UE. The protection level may describe the maximum likely position error (e.g., 5 m) to a specified degree of confidence (e.g., 99%). The protection level may be computed based on the UE knowledge of uncertainty of measurements obtained from a particular satellite, for example, the user range error and/or tropospheric effects and/or ionospheric effects, and/or the local multipath effects, uncertainty of the satellite, orbit, clock, bias correction, uncertainty of the ionosphere model, uncertainty of the troposphere model, uncertainty of the measurement in the given multipath and/or noise in the receiver. For computing such quality indicator, the UE may be provided assistance data describing the local multipath effects, information collected by external monitoring systems (such as GNSS CORS reference network) or based on the information collected by the wireless communication network based on feedback from other UEs.

The integrity status of GNSS signals may be detected and/or reported as events (such as interference, spoofing and/or multipath) or the existence of such events causing integrity faults may be implicity conveyed by calculating parameters, such as protection level, and comparing system parameters such as alert limit and time to alert to validate whether the key performance indicators such as target integrity risk (TIR) are met.

The above information may be requested by the network entity using the RequestLocationInformation message and the UE may provide the information to the NW entity using ProvideLocationInformation. Between an RAN entity (e.g. NG-RAN node, TRP, etc.) and the CN entity (e.g., AMF or LMF), the NRPPa protocol may be used.

In particular, the protection limit may be carried using the LPP message ProvideLocationInformation. This may be a field inside the CommonIEsProvideLocation Information. For example:

```
-- ASN1START
CommonIEsProvideLocationInformation ::= SEQUENCE {
    locationEstimate            LocationCoordinates            OPTIONAL,
    velocityEstimate            Velocity            OPTIONAL,
    locationError               LocationError            OPTIONAL,
    . . .,
    [[    earlyFixReport-r12              EarlyFixReport-r12     OPTIONAL
    ]],
    [[    locationSource-r13             LocationSource-r13     OPTIONAL,
          locationTimestamp-r13          UTCTime              OPTIONAL
    ]],
    [[
          segmentationInfo-r14    SegmentationInfo-r14 OPTIONAL                -- Cond
    Segmentation
    ]]
    [[
          protectionLevel-r17    INTEGER(minVal..maxVal)       OPTIONAL     --
    Cond GNSS integrity
    ]]
}
```

In embodiments, the information message further comprises a correction information.

In embodiments, the third apparatus is configured to transmit the information message to the second apparatus via an uplink channel, or wherein the first apparatus is configured to transmit the information message to the first apparatus via a sidelink channel.

In embodiments, the third apparatus is one out of
a UE [e.g., mobile or fixed UE],
a base station,
a TRP.

In embodiments, the integrity information further comprises parameters/characteristics describing the integrity status [e.g., interference type, position, time, raw measurements, snapshot of data or movement model].

Further embodiments provide a third apparatus [e.g. base station, UE, TRP] comprising: a mobile communication transceiver [e.g., RAT transceiver; e.g., 5G/NR transceiver] configured to operate in a mobile communication network, a GNSS receiver configured to receive GNSS signals, wherein the third apparatus is configured to transmit a third information message to the second apparatus [e.g., in response to a request from the second apparatus], the third information message comprising a portion of the received GNSS signals [e.g., Galileo PRS signal or Galileo OS signal] or measurements of the received GNSS signals, together with a position determined based on the received GNSS signals to the third apparatus [e.g., in order to enable the second apparatus to determine the integrity status of the GNSS signals].

Further embodiments provide a method for operating a first apparatus. The method comprises a step of receiving GNSS signals. Further, the method comprises a step of operating in a mobile communication network. Further, the method comprises a step of determining at least one parameter [e.g., position and/or velocity and/or system time and/or GNSS measurements] based on the received GNSS signals. Further, the method comprises a step of receiving an information message from a second apparatus or a third apparatus of the mobile communication network, the information message comprising an integrity information [e.g., flag, one or more bits] describing an integrity status [e.g., disturbed or normal] of the GNSS signals [e.g., in a geographical or logical area the apparatus is located] [e.g., describing whether the GNSS signals are disturbed [e.g., spoofed or jammed]. Further, the method comprises a step of determining the at least one parameter in dependence on the integrity information or reporting the at least one parameter taking into account the integrity information or taking a specific action in dependence on the integrity information.

Further embodiments provide a method for operating a second apparatus. The method comprises a step of operating in a mobile communication network. Further, the method comprises a step of transmitting an information message to a first apparatus or a group of first apparatuses of the mobile communication network, the information message comprising an integrity information describing an integrity status [e.g., disturbed [e.g., spoofed or jammed] or normal] of the GNSS signals in a geographical or logical area in which the first apparatus or group of first apparatuses is located [e.g., describing whether the GNSS signals are disturbed].

In embodiments, the information message could further comprise information derived from the parameters collected from a group of first and/or third apparatuses (e.g., nodes (e.g. RAN nodes and/or UEs)) in the vicinity, the group of first and/or third apparatuses report regionalized measurements and events (including but not limited to local multipath effects, tropospheric effects, ionospheric effects, jamming, interference and/or spoofing events), uncertainty of GNSS system relevant aspects (such as satellite orbit, clock, bias correction, etc.) which may be determined by external GNSS CORS reference network, UE range errors and so on. The integrity status of GNSS signals may be detected and/or reported as events (such as interference, spoofing and/or multipath) or the existence of such events causing integrity faults may be implicitly conveyed by calculating parameters, such as protection level, and comparing system parameters such as alert limit and time to alert to validate whether the key performance indicators such as target integrity risk (TIR) are met. In other words, the LMF computing the UE position (in case of LMF based) may take into account the fact that it has been signaled the integrity event (such as local multipath, jamming, inter-system interference, spoofing) while computing protection limit and accordingly provide the LCS client or a group of first or third apparatus assistance data to help compute their position and/or quality of integrity information.

In embodiments, the apparatus could also report the detected local multipath (e.g., power delay profile of the received signals) for one or more frequency bands. The local multipath report may consist of the characteristics of the signal components, e.g., relative delay, phase, amplitude at a certain area. The local multipath report reported by first and/or third apparatuses may be used to determine integrity information (e.g., protection level and/or for bounding the errors). They may also be crowdsourced from multiple UEs to determine the average error pertaining to an area. One example of such device detecting local multipath could be positioning reference units (PRUs), which may be stationary UEs or network nodes. The multipath reported by such reference units (first and/or third devices) may be used to compensate/correct the measurement report made by other mobile devices whose position is to be determined (first device).

The second apparatus, based on the protection level computation of one or more third apparatus, and optionally based on an indication of integrity event, computes an offset or correction factor to be used by a first apparatus while computing its protection level and provides the correction factor to a first apparatus. This may be a regionalized correction factor, which takes into account the protection level computed by a UE or a group of UE, and announces this correction factor to a group of UEs. The second device also may take into account the multipath profile reported by one or more of the first or third devices to provide regionalized correction factor for the UEs.

The second apparatus, may use the protection level reported by a group of UEs within a certain area to determine the lowest protection level possible for the UEs in a certain vicinity. This information may be used to lower bound the protection level reported by the UE, when reporting the positioning results (position, and/or velocity, and/or time and/or protection level) to the LCS client.

Further embodiments provide a method for operating a third apparatus. The method comprises a step of receiving GNSS signals. Further, the method comprises a step of operating in a mobile communication network. Further, the method comprises a step of determining an integrity status [e.g., detect an integrity fault and/or an integrity event] of the GNSS signals. Further, the method comprises a step of transmitting a second information message to a second apparatus or a first apparatus of the mobile communication network, wherein the second information message comprises an integrity information describing the integrity status of the GNSS signals.

Further embodiments provide a method for operating a third apparatus. The method comprises a step of receiving GNSS signals. Further, the method comprises a step of operating in a mobile communication network. Further, the method comprises a step of reporting a known or computed position [e.g., location] [e.g., computed based on the received GNSS signals] of the third apparatus to a first apparatus or a second apparatus of the mobile communication network. Further, the method comprises a step of transmitting a second information message to the second apparatus or the first apparatus of the mobile communication network, wherein the second information message comprises a segment of a received GNSS signal [e.g., a OS signal of the Galileo satellite system].

In embodiments, the method further comprises a step of authenticating the reported position based on the segment of the received GNSS signal using a PRS secure server running on the first apparatus or the second apparatus [e.g., for generating integrity information].

Figure 9:
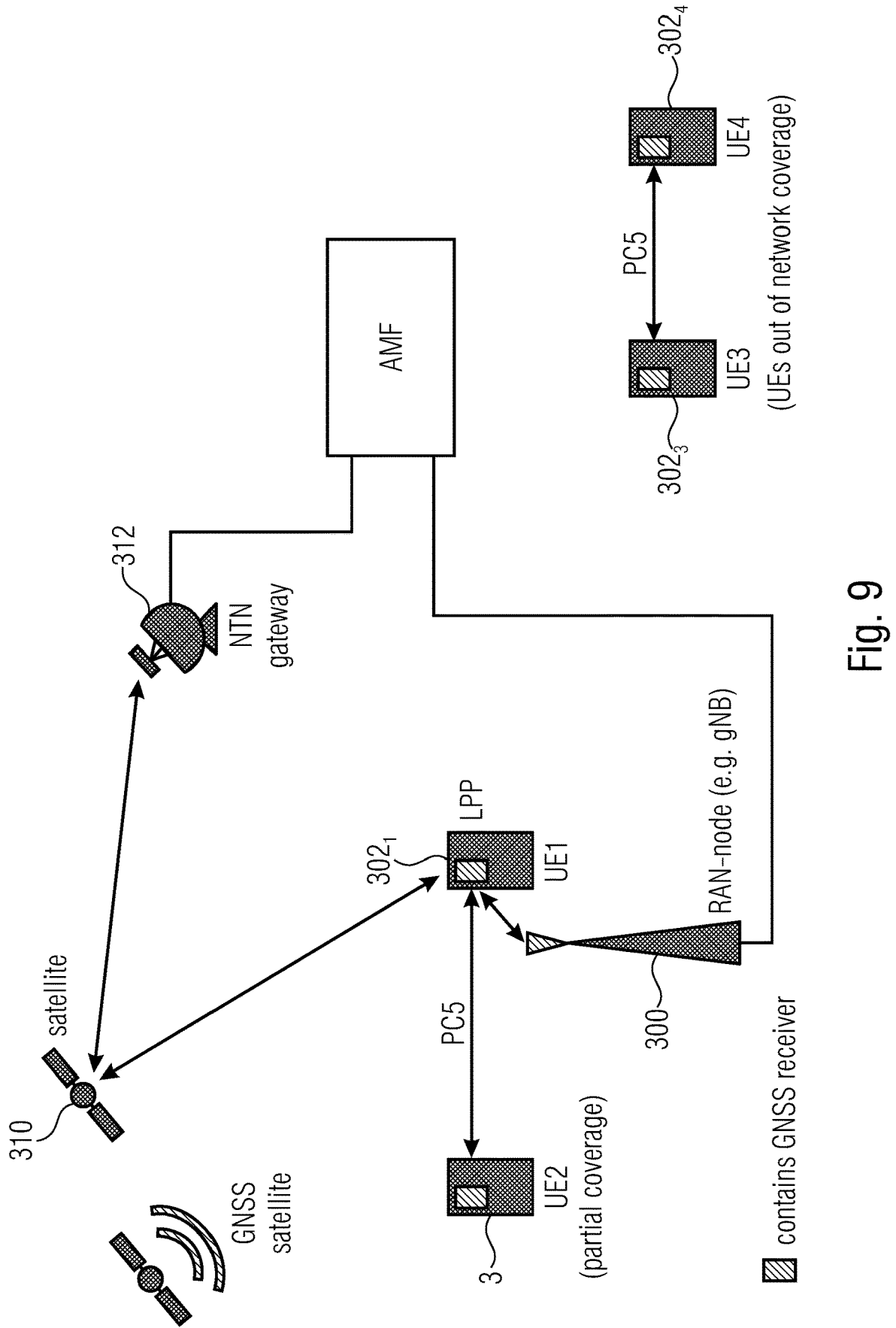

An example of a 3GPP network showing different network entities a UE can connect with is shown in FIG. 9. In detail, FIG. 9 shows a depiction of a UE connection in a 3GPP wireless network. As shown in FIG. 9 the UEs $302_1$, $302_2$, $302_3$ and $304_4$ can connect to the mobile network through a logical entity called RAN-node 300. The RAN-node 300 may be an NG-RAN node such as a gNB or an ng-eNB. Thereby, in FIG. 9 it is exemplary assumed that the first UE is in coverage, a second UE $302_2$ is in partial coverage and third and fourths UEs $302_3$ and $302_4$ are out of coverage.

The UE $302_1$ connects to the mobile core network through the NG-RAN node 300 and the access and mobility function (AMF). The AMF serves as a logical connection point for the UE to the network for control signaling. The UE $302_1$ may receive its control and data signals from a base station 300 located close to the earth surface or from communication satellites 310, e.g., which are connected via a NTN gateway 312 to the AMF. A UE may even receive a signal from another UE using sidelink communication, either in partial coverage, where the second UE $302_2$ is connected via the sidelink to the first UE $302_1$, which may have direct connection to an NG-RAN node 300 or in an out-of-coverage mode, where the two UEs, such as the third and fourth UEs $302_3$ and $302_4$, are connect to each other without network coverage at least on one carrier frequency.

In general, the UE may receive radio signals from at least one of the following: GNSS satellites, communication satellites, high altitude platform, other UEs, NG-RAN nodes, base stations, transmission and reception points (TRPs), which it may also use for positioning purposes.

Figure 10:
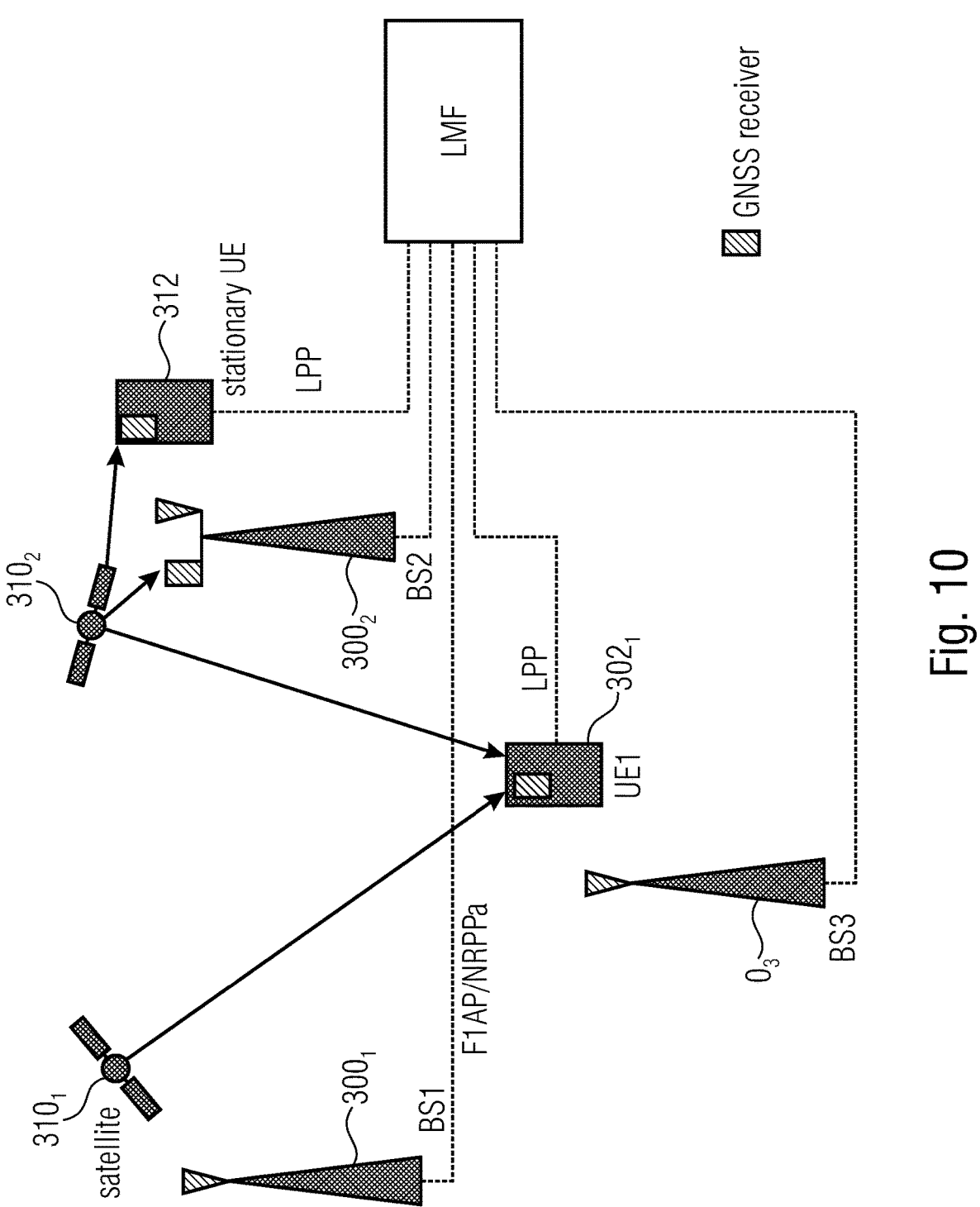
FIG. 10 shows a schematic representation of a 3GPP network with important entities involved in positioning according to Rel. 16.

A 3GPP network with important entities involved in positioning according to Rel. 16 is depicted in FIG. 10. In detail, FIG. 10 shows a depiction of interfaces between the entities for positioning in a wireless network. In FIG. 10 it is exemplarily assumed that a first UE $302_1$ comprises a GNSS receiver for receiving GNSS signals, wherein the first UE $302_1$ can be connected to the mobile core network and the LMF through one or more RAN nodes $300_1$, $300_2$ and $300_3$ and/or via on or more satellites $310_1$ and $310_2$. Also the RAN nodes, such as the second RAN node $300_2$, can comprise GNSS receivers for receiving GNSS signals. The 3GPP network also can comprise stationary UEs 312 that might be equipped with GNSS receivers.

In embodiments, a UE can receive a signal from different radio access technologies (RAT), such as LTE or NR signals, WiFi/BT signals (not depicted) and/or from GNSS satellite systems. The UE may also be equipped with sensors which may be used according to Rel. 16 for determining displacement. The UE can also able to transmit signals in the uplink for positioning, which may be received by antennas of one or more network entities known as transmit and receive points (TRPs). The location server receives measurements from various entities, UEs and network elements and computes the position or provides assistance data to the UE to enable measurements and/or compute the position. The position computed by the UE may be used by different entities, either within the network, by the UE itself or by entities outside the network.

In embodiments, the UE may compute the position using the measurement that it has collected and/or using measurement provided by the network. This variant is called UE-based positioning. In a second variant, the UE may report measurements to an entity in the network. The network entity may be NG-RAN node or the location server in the network (for example, the LMF, E-SMLC or other location server, or the local LMF functionality in the NG-RAN node itself) or any other network function. The network entity may take UE measurement and/or measurement from network nodes (e.g., TRP, NG-RAN nodes, LMU) to compute the position. Signaling between the location management function (LMF) and the UE can be carried over the LTE positioning protocol (LPP). The LPP protocol is transparently forwarded through the gNB and AMF to the LMF.

Likewise, the LMF also can communicate with NG-RAN nodes through the AMF using NRPPa protocol. The NRPPa protocol can be transparently forwarded by the AMF to the LMF.

In embodiments, the UE receives communication and control signals from the mobile communication network through one or more network entities. The network entities may be RAN nodes, such as NG-RAN node, gNB, eNB or a TRP. The term gNB can refer to a logical entity NG-RAN in 3GPP architecture or depending on context it can mean a base station. In one variant, the UE can receive a signal from antenna located connected to a network element in the terrestrial network, such as TRP or a base station. In another variant, the UE can receive a signal from the antenna located to a network element in a non-terrestrial network (NTN). The network element in a non-terrestrial network may be a high-altitude platform, aerial vehicle, an-airborne base-station, drone, geo-stationary satellite, LEO satellite, MEO satellite, HEO satellite, a communication satellite, a satellite using a transparent payload or a satellite using regenerative payload. In case of transparent payload, the waveform signal undergoes RF-filtering and/or frequency conversion and/or amplification. In case of regenerative payload, the waveform may undergo RF-filtering and/or frequency conversion and/or amplification, and/or demodulation and/or decoding and/or switching and/or routing, coding and/or modulation.

In embodiments, the position computed by the UE or the measurement reported by the UE may differ from the true value due to impairing factors. Examples of impairing factors in a non-limiting sense include noise, interference, receiver architecture, signal bandwidth, spoofing signals and so forth. Different applications may have different demands in terms of accuracy and require different level of confidence that can be placed in the navigation solution (position, velocity, time) computed by the positioning algorithm. In other words, whether the navigation solution can be trusted for the level of accuracy and latency required by the application, depends on the capability of the UE and/or the network elements and/or the network itself.

In embodiments, the client of the location services (LCS)—which may be an external client, the UE initiating the location request or the network itself, may or may not be able to trust the computed position and may need an alternative mechanism to validate the position reported by the UE. In a UE based positioning, the location computed by the UE may not be reliable if there are conditions in the vicinity of the UE that cause integrity issues. Example of these could be jamming or spoofing. If these integrity issues or integrity can be detected by at least one entity in the network, the network can determine whether it is applicable to the UE in question and issue integrity alerts or integrity information accordingly.

Likewise, it is also possible that the UE manipulates the reported measurements (for example, intentionally in order to conceal its real location) or reports wrong measurements to the network (for example, due to integrity issues in the vicinity). As such, the network may not be able to trust the measurement provided by the UE. For example, the UE may initiate an emergency call, but the position reported by the UE may or may not be correct. In one scenario, a UE may be connected to a satellite connecting to a 5G core network. The network operator needs to know a reliable position, for example, to be able to trigger the authorities of the correct country according to the emergency services. In another example, the network operator may need to determine the user position with reliability to provide customization of user services (for example, firewall rules, language settings, content filtering and so on) or to compute correct roaming charges. In other scenario, the UE may directly be connected to network entities such as base stations, which may themselves or with help of other NW-entities be able to inform the UE of existence of integrity issues in the vicinity of UE. In a further scenario, a UE may only be able to connect to a second UE and may not have connection to the network. The UE may be able to receive information on integrity issues to another UE or receive such information from other UEs in the vicinity.

Figure 7:
FIG. 7 is a schematic representation of the location services (LCS) architecture with core network components represented as service based interface representation.

FIG. 10 also depicts various capabilities of network elements and UEs. Some of the UEs, such as the first UE $302_1$, may be equipped with one or more GNSS receivers, sensors, such as inertial measurement unit or barometers and so on, or even inertial navigation system (INS). Some of the NW elements, such as the second RAN node $300_2$, may be equipped with GNSS receivers, whereas other may not have them, such as first and third RAN nodes $300_1$ and $300_3$. The category of GNSS system contained in different types of UE may also vary. Some of the UE may be permanently fixed to a particular location, such as the stationary UE 312, whereas other may be momentarily mobile or static. An example of UEs permanently fixed to a particular location (such as the UE 312 depicted as stationary UE in FIG. 7) may be monitoring stations having interfaces corresponding to a UE and are configured to detect integrity issues and/or report measurements and/or compute correction parameters for the GNSS and report to the network. The information may be used by the network to provide correction to other UEs in the network. As an example in a non-limiting sense, a roadside unit (RSU) may be implemented as a stationary UE and may also be able to report GNSS integrity issues to the network. LPP protocol is one example of how the information may be conveyed to the network from the stationary UE, functioning as a RSU in sidelink.

In embodiments, a NG-RAN node could also be implemented as a roadside unit (RSU) or a monitoring station or it may have GNSS capabilities in addition to normal NG-RAN functionality. It may be able to report the integrity related information to the LMF or to other network node. The integrity information may then be carried over the NRPPa protocol.

In embodiments, the positions computed based on measurements of radio signals, e.g., GNSS or NR signals, are made more reliable by exploiting the monitoring and reporting capabilities of different entities (UEs, network entities—such as base stations (BSs), TRPs, NG-RAN nodes, NTN-satellites) or information available to the network from external entities.

In embodiments, a UE to be positioned (e.g., which could be a potential victim of GNSS spoofing or jamming) is provided with (1) a message including integrity information related to the (2) geographical area the UE finds itself in, wherein the integrity information can be derived from at least one UE or a network entity (e.g., TRP or a RSU) or from other information available in the network, so that the victim UE can take appropriate actions to recover from the integrity event (e.g., spoofing or jamming).

In embodiments, the integrity information provided by the UE or provided to the UE is subject to UE capability, since different references UE have different capabilities (e.g., IMUs, multi-antenna), the reported information can include a quality and uncertainty information.

In embodiments, the geographical area can be related to a cell ID, tracking area ID, zone ID and similar ID associated with an area or defined by local coordinate system or a global coordinate system.

In embodiments, the network may configure at least one UE to compute position at the UE and report at least one parameter from the position, velocity and/or time together with a portion of at least one wireless signal received by the UE corresponding to the computed parameter reported by the UE. In embodiments, the portion of the at least one wireless signal reported by the UE may be at least one of the following:

1) A portion of at least one GNSS signal from at least one GNSS system. These signals may be sent further by the network to a server within the core-network or to an external secure server or a secure network via a Gateway for server-based PRS authentication against spoofing or interference classification.

2) A portion of at least one signal from RAT-technologies or measurement derived thereof. This may be signals of 5G-NR reference signals, LTE reference signals or other wireless technology signals. The entity processing the signals may inform at least one network entity whether the reported UE location is reliable or not.

In embodiments, the network may configure a UE to at least one parameter and signal as described above, when at least one entity in the network (e.g., UE or RAN-node) has reported integrity issues in the network. Alternatively, the network may configure a UE to report at least one parameter and signal as described above for the network to assure the integrity of the location service reported by the aforesaid UE. An example in a non-limiting sense for this alternative is the verification of a location reported by the UE connected to an NTN network. In this case, the integrity information may be exchanged between two satellites in a regenerative payload over the inter-satellite links (ISL).

In embodiments, different entities in the network have different capabilities to generate and/or consume the information regarding integrity to varying degrees. By collecting the information from various entities, the network will be able to determine the area where the integrity issue is relevant and provide assistance data targeted to this area.

In embodiments, the network may be able to detect the change in integrity event and trigger the UE by mechanisms, such as paging, to react to the integrity events in a fast manner:

1) Enabling a UE or a network entity to inform the network the integrity event is detected.

2) The network takes into account information from any combination of UE, network entities and external information system to establish the boundary of the region where the integrity alert is to be established. The boundary could be a portion of a cell, a RAN-notification area, a cell, or any other notification area.

3) The network provides mechanism to communicate the integrity information to the relevant UEs. It may also provide mechanism for actively alerting the UE to acquire the integrity information.

4) The UE responds to the signaling provided by the network or other UEs and take appropriate measures, such as not trusting the measurements or using the corrections.

In embodiments, the UE may report its capability of detecting integrity event to the network, either unsolicited or in response to the capability request from the network. The network element to which the UE may provide the capability request may be LMF, local LMF (e.g., a subset of LMF functionality within the NG-RAN node), NG-RAN node, AMF, other network functions and/or external servers. Likewise, the NW elements may also communicate the capability to monitor integrity events either detected by GNSS receivers or systems within the network element or in the vicinity. This capability of the NW elements to interact with location server (either on NG-RAN node or core network) to provide their capability may be carried out using the messages within the LPPa or NRPPa messages or it may be handled by operation and maintenance functionality. Likewise, the capability of UEs or the network elements that are able to make such measurements may also be obtained by using prior knowledge of the device stored either within the network or within an external database.

In embodiments, the UE can be a NR capable device. The device supports transmission and/or reception of signals over the satellite either having a transparent payload or regenerative payload. The network would like to determine the location of this UE in a reliable manner. The network may trigger the UE to report its position at least a position and/or velocity and/or time using at least one GNSS measurements of at least one GNSS signal from at least one GNSS satellite. Alternatively, the network may trigger the UE to report the measurement made by the UE using at least one GNSS measurements of at least one GNSS signal from at least one GNSS satellite. To enhance reliability, the network may configure the UE to report at least a portion of signal taken in a window of time corresponding to the measurement of GNSS signal or the computed position and/or velocity and/or time. The network may receive the information either over the NTN satellites via the NTN gateway and/or via the terrestrial network consisting of base stations. In case of UEs in sidelink (e.g., partial coverage or out of coverage), the information may also be communicated first via sidelink before reaching either the NTN satellite or the base stations.

In embodiments, the network may take the parameter reported by the UE, where the parameter can be at least one out of position and/or velocity and/or time, or the network may determine at least one out of position and/or velocity and/or time from the measurements reported by the UE. The network can report the position and/or velocity and/or time together with the measurement to a secure server processing the GNSS signals to get an integrity parameter and/or authentication. The integrity parameter may be simple confirmation that the reported parameters are correct and/or consistent with the reported measurement or it may provide a quality indicator, where quality indicator indicates a relative confidence in the decision.

An example of the quality indicator may be the protection level computed by the UE. The protection level describes the maximum likely position error (e.g., 5 m) to a specified degree of confidence (e.g., 99%). The protection level may be computed based on the UE knowledge of uncertainty of measurements obtained from a particular satellite, for example, the user range error, and/or tropospheric effects and/or ionospheric effects, and or the local multipath effects, uncertainty of the satellite, orbit, clock, bias correction, uncertainty of the ionosphere model, uncertainty of the troposphere model, uncertainty of the measurement in the given multipath and/or noise in the receiver. For computing such quality indicator, the UE may be provided assistance data describing the local multipath effects, information collected by external monitoring systems (such as GNSS CORS reference network) or based on the information collected by the wireless communication network based on feedback from other UEs.

In other words, the LMF computing the UE position (in case of LMF based) may take into account the fact that it has been signaled the integrity event (such as local multipath, jamming, inter-system interference, spoofing) while computing protection limit and accordingly provide the LCS client or a group of first or third apparatus assistance data to help compute their position and/or quality of integrity information. This means, the detection of integrity events (such as jamming, inter-system interference, spoofing) or the reception of assistance data indicating the integrity events help determine the protection level. As an example, reception/detection of assistance data indicating jamming, spoofing or interference could be taken into account while determining the protection level by increases the determined protection level by a certain amount (x m).

A second example of GNSS signal that may be recorded by the UE and received by the secure server for validation may be the Galileo PRS (public regulated signal) and the server could be a secure server designated to process the public regulated signal. This server could be located within the 5G core in embodiments. Alternatively, the server could be located outside the 5G core and the parameters (e.g., position and/or velocity and/or time) and the measured signal can be reported via a gateway to an external secure server and a response can be obtained from this server. Note that the Galileo PRS is an example, wherein embodiments might be applied to similar services offered also in future by other GNSS satellites or positioning satellites.

One way to communicate the above information may be via the LPP signaling between the UE and the LMF, which transparently passes through the NG-RAN node (both terrestrial base station and/or NTN satellites and gateway included) and/or it may use the RRC signaling between the UE and the NG-RAN node. Alternatively, MAC signalling may also be used.

If the UE is asked to report the capabilities, the UE reports its capability indicating the support for at least one of the following:

1. Supported GNSS systems (e.g., GPS, GNSS, GLO-NASS, Beidou).
2. Supported signal on at least one of the GNSS systems, for example, GPS L5, Galileo E5a, and L5 SBAS, Galileo E5b, GPS L2, and L2 SBAS, BeiDou B1-I, GPS L1 CA, Galileo E1BC, BeiDou B1-C, and L1 SBAS, GLONASS G1 etc.
3. Capability of the UE to monitor and/or correct integrity events or integrity faults.
4. Capability of the UE to detect impairing factors (e.g., spoofing, jamming).
5. Capability of UE to receive and/or process certain category of signals, such as encrypted signals, OS-NMA authentication, etc.
6. RAT capability.
7. Indication of support of UE features, such as sidelink, NTN.
8. Indication of the type of the UE, for example, if it is a UE that supports public regulated service.

FIG. 11 shows a flowchart of a method 400 for detecting an integrity event in a network and communicating same to a network entity, such as UE. In other words, FIG. 11 shows a flowchart description of determining and alerting network entities, such as UEs, about integrity events in network.

The method 400 comprises a first step 402 of detecting an integrity event (e.g., spoofing, jamming) by one or more network entities, such as UEs or base stations. Further, the method comprises a second step 402 of reporting the integrity event optionally together with an information describing an event type (e.g., spoofing, jamming, local multipath) and/or other parameters to a second network entity. Further, the method 400 comprises an optional third step 406 of requesting, by the network entity, one or more third network entities, e.g. UEs, to perform and/or provide measurements. Further, the method 400 comprises a fourth step 408 of determining, by the network entity, severity and applicability region of the integrity event (e.g., spoofing, jamming, local multipath) based on measurements from one or more network entities. In a fifth step, the network or network entity broadcasts the integrity alert to a UE or group of UEs within the determined applicability region.

In embodiments, the applicability region may be described at least using by GAD shapes (e.g., ellipsoid point, ellipsoid point with uncertainty circle, or a polygon).

In other words, the mechanism of determining an integrity event, processing an integrity event, and providing an integrity alert to a UE may be depicted in a flowchart form as shown in FIG. 11.

Subsequently, the different steps of the method 400 are described in further detail.

First Step 402: Detection of Integrity Events

For detecting an integrity event, such as spoofing or jamming, an existing mechanism such as AAIM, ARAIM, signal power detection, spectral detection techniques, inertial sensors deviation detections, or array based detection techniques, may be used by NW elements.

A NW element may request a second NW element to detect integrity events. A NW function or element (for example, a location server/LMF) may request a NW element (e.g., a TRP, BS, gNB) to monitor multiple frequency bands and GNSS signal.

Case 1: Monitoring Using the Network Infrastructure Elements

The NW infrastructure elements could include entities, such as BS, TRPs, which may be equipped with GNSS receivers. The NW infrastructure elements could be equipped with multi-frequency multi-system GNSS receivers with improved monitoring capabilities.

The network can monitor interference and spoofing in one or more of the GNSS signals, such as 1171-1181 MHz—GPS L5, Galileo E5a, and L5 SBAS
1202-1212 MHz—Galileo E5b
1222-1232 MHz—GPS L2, and L2 SBAS
1559-1563 MHz—BeiDou B1-I
1570-1580 MHz—GPS L1 CA, Galileo E1BC, BeiDou B1-C, and L1 SBAS
1590-1610 MHz—GLONASS G1

For example, for interference detection, a fast Fourier transform (FFT) and basic threshold detection facilitates frequency selective interference detection can be used. Alternatively, the use of a filter bank and power detectors could achieve similar frequency selective detection. Monitoring the C/NO could also indicate that some signals are affected by interferences.

For example, for spoofing detection, ARAIM could detect the position, velocity and time (PVT) differences between different signals and systems, and therefore flag a system as being spoofed. Alternatively, authentication methods, such as OS-NMA could be used to detect whether a signal is spoofed. Lastly, for fixed installations, i.e., the receiver has a stationary position, any position deviation could be identified as a spoofing attack.

Case 2: Monitoring Using UEs

Two base stations may be separated with large distances from each other, such that the integrity faults that are not detected and/or not experienced by the GNSS receivers co-located and/or near the base stations may be detected by UEs that are located in-between the BSs. Furthermore, there may be UEs that are not within the coverage region of a BS which may also detect integrity fault events. These UEs facilitate determining the scope and/or severity of the integrity faults and signal it to the NW.

In embodiments, the UE may have advanced GNSS receivers integrated, such as multi-frequency and multi-system receivers, so that they are capable of detecting integrity faults. Some methods for detecting integrity faults include but are not limited to:

Spoofing detection: Doing a subset of PVT calculations may be used to identify spoofing GNSSs and signals.

Spoofing detection: Comparing pseudo-ranges between different frequency bands on the same SV.

Interference detection: Detect C/NO on different frequency bands form the same SV.

In embodiments, the UE can signal its capability to a NW entity, where the capability report comprises at least one of the following:

Integrity fault the UE can report.

The frequency bands and/or signal types it supports.

Additional sensors it is equipped with and/or it can use for integrity computations.

Method it can use to detect integrity.

UE features.

Motion reporting.

UE context (for example, a UE inside a moving train).

Supported GNSS systems (e.g., GPS, GNSSGalileo, GLONASS, Beidou).

Supprted signal on at least one of the GNSS systems, for example, GPS L5, Galileo E5a, and L5 SBAS, Galileo E5b, GPS L2, and L2 SBAS, BeiDou B1-I, GPS L1 CA, Galileo E1BC, BeiDou B1-C, and L1 SBAS, GLONASS G1 etc.

Capability of the UE to monitor and/or correct integrity events or integrity faults.

Capability of the UE to detect imparing factors (for example, spoofing, jamming).

Capability of UE to receive and/or process certain category of signals, such as PRS encrypted signals, OS-NMA authentication, etc.

RAT capability.

Indication of support of UE features, such as sidelink, NTN.

Indication of the type of the UE, for example, if it is a UE that supports public regulated service.

Second Step 404: Reporting the Event by a First NW Entity to a Second NW Entity The network entity could be a UE, a BS, a NG-RAN node (e.g., a TRP, gNB, gNB-CU, gNB-DU, A-Satellite with transparent or regenerative payload connected to 5G core via NTN gateway) which has GNSS receiver capabilities. After determining the integrity event, the first NW entity may report to the second NW entity a set of information about the integrity event. The information could be carried using F1AP, NRPPa messages if the BS is doing integrity monitoring. If the UE is doing integrity monitoring, the messages could be reported using LPP messages. Likewise, two UEs can exchange these methods using the sidelink interface.

The information included could include at least one of the following and may be carried in one or more of the signaling messages.

A first signaling message can be a flag indicating a detection of an integrity fault on at least one GNSS signal.

The UE with capabilities to detect or correct an integrity fault may report the flag indicating the integrity fault on at least one GNSS signal to a NW entity. Likewise, a NW entity, such as a BS, equipped with a GNSS receiver can signal the integrity issue to a second network entity. The second network entity may be a UE or a location server.

An example, in a non-limiting sense, can be that the first NW entity signals two bits to the second NW entity, where the first bit could indicate the presence of interference and the second bit could indicate the presence of spoofing.

Likewise, the first NW entity can signal one bit of information per system and per band to identify interference and/or spoofing.

Alternatively, a network entity (e.g., UE or BS) can send an information message to another network entity (e.g., UE or BS), where the information message may contain one or more of the following:

Several bits signaling the integrity status of each GNSS system and/or frequency bands and/or GNSS signal.

Confidence and/or quality of integrity information. An example of the quality indicator may be the protection level computed by the UE. The protection level describes the maximum likely position error (e.g., 5 m) to a specified degree of confidence (e.g., 99%). The protection level may be computed based on the UE knowledge of uncertainty of measurements obtained from a particular satellite, for example, the user range error, and/or tropospheric effects and/or ionospheric effects, and or the local multipath effects, uncertainty of the satellite, orbit, clock, bias correction, uncertainty of the ionosphere model, uncertainty of the troposphere model, uncertainty of the measurement in the given multipath and/or noise in the receiver. For computing such quality indicator, the UE may be provided assistance data describing the local multipath effects, information collected by external monitoring systems (such as GNSS CORS reference network) or based on the information collected by the wireless communication network based on feedback from other UEs.

Prediction of integrity information in the next area.

A second signaling message can be reporting the position or velocity of the NW entity.

If the NW entity used is a fixed infrastructure entity, such as a BS or a TRP, with a GNSS receiver or monitoring device, then the reported information could be reported with the 'true' position of the device. The true position, could be the estimate obtained based on previous measurement when the device was not experiencing interference and/or spoofing. Likewise, the computed PVT in presence of interference or spoofing could be reported.

A third signaling message can be reporting the type of integrity event and parameters/characteristics of the integrity event.

The interference type and characteristics of the integrity event can be reported. For example, the E5/E6 GNSS frequency bands overlap with the ARNS frequency bands. Hence, aeronautical systems such as DME or TACAN are allowed to transmit in these frequency bands and is the type of interference to be expected in the system. On the other hand, there could be interference from the amateur radio band in GNSS E6 frequency band. The characteristics that could be reported in this case could be signal power of the interference signal.

The characteristics that could be reported could include one or more of the following:

Interference type, such as DME, TACAN, amateur radio, strength of interference.

Position.

Time.

Raw measurements, in particular, the network could evaluate the signals from the UE or NW-elements in the core-network or using edge-computing.

Snapshot of data. The snapshot of the data can be reported to the Galileo-PRS server-based positioning together with the positioning estimates. The location server may also interact with external Galileo-PRS server (outside the 5G core) to validate the integrity of the snapshot measurements. The external server may be able to receive the snapshot of the data recorded by the UE, and process the data and determine whether the ranges reported by the UE are consistent with the raw measurements or not for given integrity requirement.

Movement model of the reporting UE and parameters of the movement.

According to a further embodiment, the UEs may report the detected integrity faults and/or parameters and/or characteristics with a specific identifier associated with the UE or a group of UEs. The NW could associate a UE or a group of UE to a special group where the NW combines the information from one or more than one group of UEs based on this ID. As an example, the specific identifier could be associated to the UEs associated with a certain car manufacturer or a certain fleet provider. Then the NW could use the integrity information obtained from one or more UEs from this group to prepare integrity alert and provide assistance data to a specific group or specific groups of UEs. This specific identifier for a UE or a group of UEs could be used when the integrity messages are being exchanged between UEs over a sidelink (PC5 interface).

Third Step 406: NW-Entity Requests One or More Third NW-Entities to Make Measurements The location server may configure one or more network entities (such as TRPs, BSs) to make measurements and report back.

Figure 12:
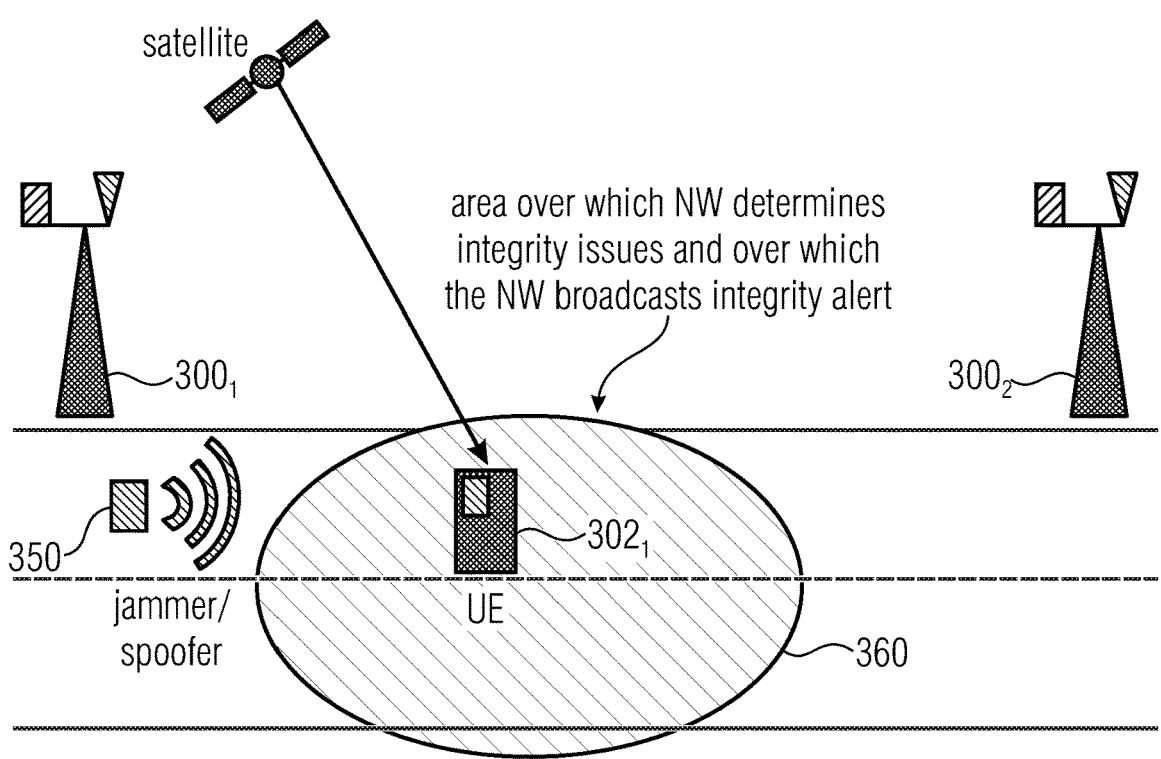
FIG. 12 is a schematic representation of a typical highway scenario where a jammer or a spoofer is impacting the GNSS signals within a certain area, according to an embodiment.

Fourth Step 408: Network Entity Determines the Severity and Applicability Region of Integrity Events Based on Measurement and Information Reported by One or More Network Entities FIG. 12 depicts a typical highway scenario where a jammer or a spoofer is impacting the GNSS signals within a certain area. In other words, FIG. 12 shows an illustrative view of a determination of area 360 over which integrity alert is to be broadcasted. As shown in FIG. 12, a UE $302_1$ equipped with a GNSS receiver can be located on a highway. The UE $302_1$ can be connected to RAN nodes, such as base stations $300_1$ and $300_2$. In this example, the UE $302_1$ may not have capabilities to detect such spoof or jamming events 350. It is also further assumed that the base stations $300_1$ and $300_2$ are equipped with GNSS receivers with capability to detect such integrity events 350. Assuming that at least one of the BS (e.g., $300_1$) has detected the integrity event 350 and the other BS (e.g., $300_2$) has not detected the integrity event 350, the information can be provided to a network entity (for example, a location server or LMF) could determine the area 360 over which the integrity alert is applicable.

Figure 13:
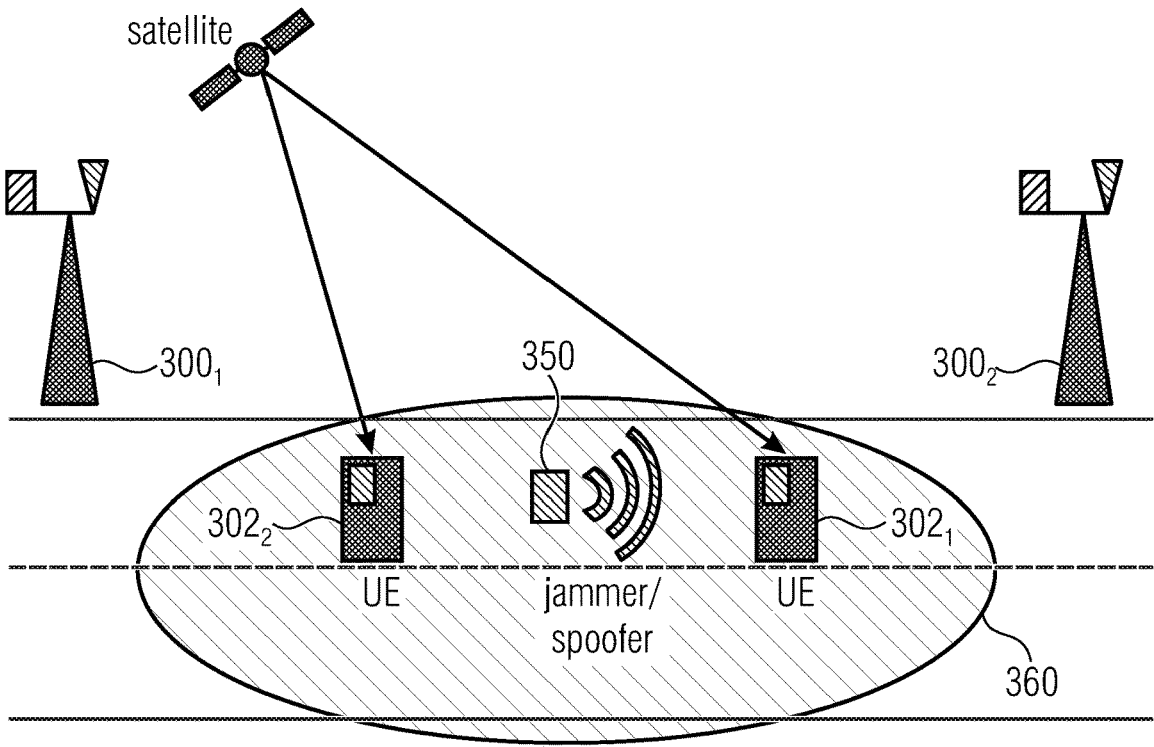
FIG. 13 is a schematic representation of a typical highway scenario where a jammer or a spoofer is impacting the GNSS signals within a certain area, according to an embodiment.

Likewise, FIG. 13 depicts a typical highway scenario where a jammer or a spoofer 350 is impacting the GNSS signals within a certain area, wherein it is assumed that at least one BS (e.g., $300_2$) does not have GNSS receiver with capability to detect the integrity event. In other words, FIG. 13 shows a depiction of integrity events detected by group of network entities and/or UE and identification of broadcast area 360. However, if there are enough UEs, such UE $302_2$, that have the capability to detect integrity events, the position and/or velocity and/or orientation of the UE can be used to predict the region 360 where the alert is applicable. In particular, in case of moving jammer/spoofer 350 the area 360 of integrity alert also needs to be adjusted.

The network can additionally consider the movement models and parameters of the UE reporting measurement together with the parameters of spoofing and interference to establish the movement model of the spoofer/jammer. This could be used further to predict the next area where the alert needs to be raised. Furthermore, the parameters of movement may be used to cross check whether the measurements made are consistent with the reported movement model.

For determining the RTK-PPP correction, there may be a network of measurement stations (MS) that monitor the transmitted GNSS signal(s) and based on their knowledge of fixed location, determine the propagation and impairment parameters. In this context, if the location server determines that the spoofing is going on near the measurement station (MS) that provides RTK-PPP correction, then according to an embodiment the measurement station (MS) may report the spoofing event and informs the location server that it cannot recover from spoofing or it can mitigate the integrity fault and provide RTK-PPP correction.

In line with the embodiment, the location server may reconfigure a UE or a group of UEs receiving RTP-PPP correction with respect to the victim measurement station with RTK-PPP corrections from a new measurement location.

Fifth Step 410: Network Broadcasts Integrity Alert and Information to a UE or a Group of UEs After the network has determined the area where the integrity alert is applicable, the network could signal a UE or a group of UEs about the integrity alert and/or parameters and/or configure recommended action (for example, in case of UE-based positioning, the LMF may reconfigure the UE to use a different positioning method, as long as the integrity issue is still raised).

The integrity event could be associated to positioning service levels, where the positioning service levels could define the accuracy, latency and/or integrity level. The integrity alert and the assistance data could be tied to positioning service levels. Then the UE could be alerted of integrity alert if it is applicable to the positioning service level it is configured with.

Either the UE could be provided a flag, where the integrity flag is computed taking into account at least the protection level computed, and alert limit. Alternatively, the UE may determine the PL and the AL and the NW may provide the assistance data regarding AL and the UE can itself determine the integrity of positioning solution.

In embodiments, the UE may be configured with a positioning service level, which is an identifier that specifies different demands in terms of accuracy, latency, alert limit and so on. The group of UEs with similar requirement may be grouped together and the network may choose to signal these group of UEs when any integrity related information corresponding to their service level changes. A UE or a group of UEs could be signaled with dedicated signaling or common signaling. The integrity alert could be broadcasted to UEs using positioning SIBs. The positioning SIBs generated by the LMF could be associated with the area ID, and the UEs within an area where the integrity alert is raised would receive these positioning SIBs.

In embodiments, the change of integrity information may be communicated to the UE by indicating the change of system information, by altering at least one bit on at least one system information block.

In embodiments, the integrity information could be sent to the UE as dedicated control signaling, user data (application data), control signaling as SIB sent to a group of UEs, multicast to a group of UE or broadcast or even unicast.

In embodiments, the network may provide integrity information to the UE either on demand from the UE and/or autonomously by the network and/or on demand from the LCS client. The UE may signal the network that it has capability to send and/or receive integrity information.

In embodiments, if the LCS client resides within the network or is external to the 3GPP network, then the UE and/or LMF may compute the protection level. In one variant, the LMF may provide the LCS client the protection level and/or alert limit and allow the LCS client to determine itself whether the location information delivered by the positioning system is reliable for the use case or not. Alternatively, the LMF may simply provide the LCS client an integrity alert (for example, a flag or a few bits of information describing the integrity status) whereby the LCS may determine the availability or non-availability of positioning information. The information may be provided to the LCS client either directly from the LMF or via NEF or via GMLC or via sidelink.

If the network makes a request to report or to make use of integrity information, and the UE does not have this capability, then according to one embodiment, the UE reports an error to the NW entity making this request or according to another embodiment, it silently discards the request. According to one embodiment, the network makes the request to report and/or use integrity information to the UE that have this capability.

This information could be transmitted using LPP or via RRC using posSibs.

The UEs in RRC-IDLE or RRC-INACTIVE modes pose a challenge to ensure that the UE is notified within time-to-alert corresponding to alert limit and target integrity ratio. Therefore, when the integrity fault is recognized, this needs to be transmitted to the UE within the shortest possible period. This can be done by:

1) Transmitting integrity alert on a fixed resources, thereby avoiding blind decoding attempts by the UE to detect integrity alert.

2) Alternatively, the UE can be sent a message scrambled with a RNTI defined for integrity messages. This could be called integrity paging. However, different to structure of paging message, where the ID of the UEs to be paged are provided, the list of IDs of the grid where integrity faults are defined are transmitted together with a severity level. The UE depending on its need on integrity could threshold whether the alert is applicable to it.

If the UE hasn't received integrity alert, then according to one embodiment it is expected to receive message indicating there is no integrity alert in any of the grid-cells are transmitted at regular intervals. In line with this embodiment, an absence of this message indicates loss integrity messages from the network.

Figure 14:
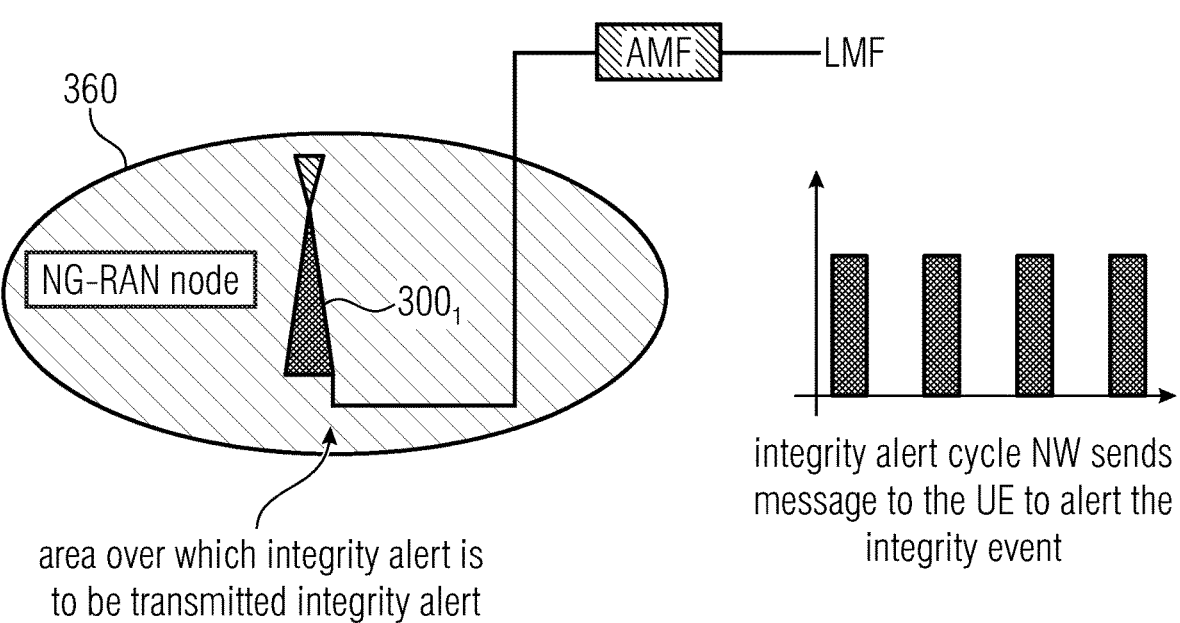
FIG. 14 is a schematic representation of an integrity event triggered by core-network paging.

FIG. 14 illustrates an integrity event triggered by core-network paging. As shown in FIG. 11, a RAN-node 300₁ can be connected to an external location management function, LMF, the via an access and mobility management function, AMF. The RAN-node 300₁ can be configured to transmit an integrity alert over area 360.

When a NG-RAN Node is equipped with GNSS receiver capable of monitoring integrity events, then it could provide the integrity alert directly to the UE on the resources where the UE monitors integrity alerts.

Figure 15:
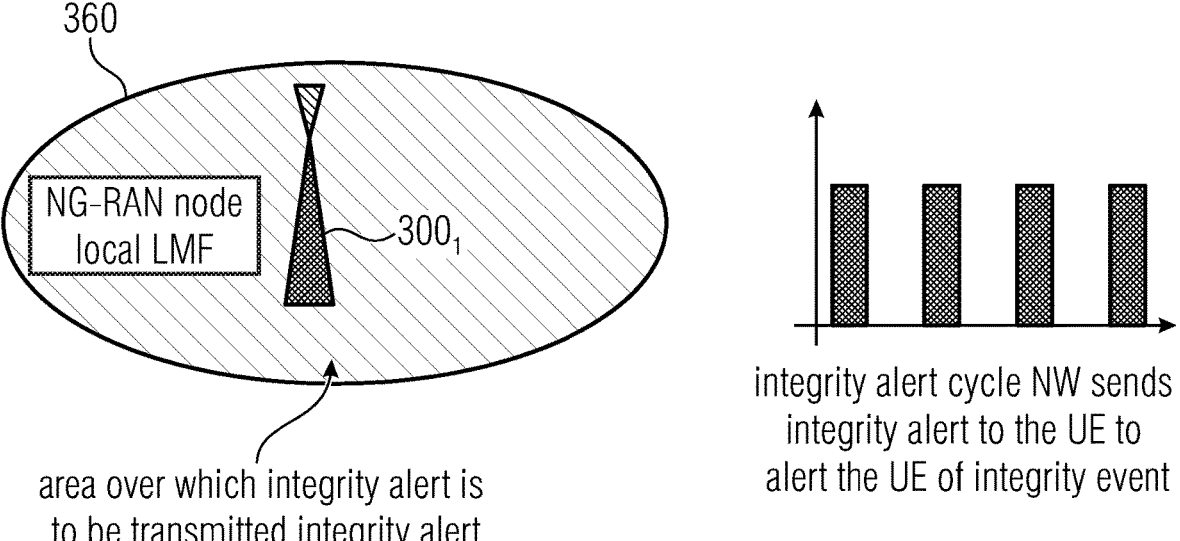
FIG. 15 is a schematic representation of an integrity event triggered by a RAN-node or a local location server within the RAN node.

FIG. 15 illustrates an integrity event triggered by a RAN-node 300₁ or a local location server within the RAN node 300₁. As shown in FIG. 15, the LMF can be integrated into the RAN-node 300₁, wherein the RAN-node 300₁ can be configured to transmit an integrity alert over area 360.

A UE on RRC-IDLE or RRC-INACTIVE mode performing positioning using GNSS methods is expected to wake up and listen to integrity alert cycle. If the integrity alert is received by the UE, the UE is expected to receive the detailed alert information. If the integrity alert pertains to the positioning signal being used by the UE, then the UE should acknowledge the receipt of integrity to the location server and await reconfiguration from the positioning server.

The positioning server may reconfigure to use a different GNSS system, different GNSS frequency or configure the UE to use RAT-dependent methods or other methods for UE-based positioning. Alternatively, the UE may be reconfigured to perform UE-assisted LMF-based positioning.

Subsequently, further embodiments are described, which can be implemented by themselves or in combination with the above described embodiments.

A first embodiment is UE-Power reduction. By providing an integrity alert to the UE, specially the UE devices that do not have advanced receiver capabilities of monitoring integrity faults, the network can assist the UE in reducing the power consumed by avoiding measuring and/or processing and/or reporting the GNSS signals deemed to have integrity issues.

A second embodiment is autonomous driving. The integrity information can be computed by different UEs capable of computing such integrity events and the information passed over to other UEs which may be in out-of-coverage scenario. The integrity information may be passed between two or more UEs using the sidelink (PC5 interface).

A third embodiment are regulatory public services—monitoring of the spectrum. Detecting, identifying, and locating interferences supports the continued use of the GNSS spectrum. Finding and removing interferences or spoofers permanently resolves the issue. Using measurements from one or more NW entities or UEs could assist the following public services:

1. Detecting an interference or spoofer and alerting the authorities. This can also provide a map of interference "hot-spots".

2. Optionally, classifying the interference type to assist authorities with appropriate actions. For example, the E5/E6 GNSS frequency bands overlap with the ARNS frequency bands. Hence, aeronautical systems such as DME or TACAN are allowed to transmit in these frequency bands and are no interferences. Falsely, detecting these and alerting the authorities are not allowed. As another example, the GNSS E6 frequency band overlaps with an Amateur Radio band. In such a case, only if a signal exceeds the predefined transmission strength, then it is problematic 3. Optionally, locating the interference source. It would assist authorities in locating the emitter equipment and addressing the issue altogether.

4. Sidelink synchronization. In sidelink, the reference timing the UE uses for deriving sidelink transmission is derived either directly from the network or from GNSS. According to NS, the synchronization sources are designated priorities from Level 1 to Level 8, described as follows:

Level 1: Either GNSS or eNB/gNB, according to (pre-) configuration.

Level 2: A SyncRef UE directly synchronized to a Level 1 source.

Level 3: A SyncRef UE synchronized to a Level 2 source, i.e. indirectly synchronized to a Level 1 source.

Level 4: Whichever of GNSS or eNB/gNB was not (pre-)configured as the Level 1 source.

Level 5: A SyncRef UE directly synchronized to a Level 4 source.

Level 6: A SyncRef UE synchronized to a Level 5 source, i.e. indirectly synchronized to a Level 4 source.

Level 7: Any other SyncRef UE.

Level 8: UE's internal clock.

If the UE is preconfigured to use GNSS as Level 1 source, then it is expected to prioritize Level 1, 2 and 3 over the corresponding levels 4, 5 or 6 if it receives two different synchronization sources. This causes the UE to use GNSS sources with integrity issues as the synchronization source. However, if the UE has received an integrity alert from the network or a trusted UE, then the UE should switch the prioritization rule and prioritise level 4, 5, or 6 until integrity alert is no longer valid.

5. Positioning integrity of a UE connected to an NTN satellite. According to this embodiment, a UE is equipped with GNSS receiver and a NR radio connects to the 5G-core network via NG-RAN node. The signal between 5G-core and the UE at some point passes through a data communication satellite. The satellite may employ transparent payload or a regenerative payload. In case of transparent payload, the gNB functionality is located in the ground and the NTN gateway provides a transparent payload to the satellite which forwards to the UE. In case of regenerative payload, the feeder link is itself a NR-interface between infrastructure elements and the control and data signal at generated on-board the satellite.

In this scenario, a reliable positioning estimate may be needed for safety of life scenario, such as fire brigade, ambulance, etc. Since the UE may have suffered from blockage or spoofing, the location reported by the UE may not be reliable. The network can then command the UE to provide at least system time and position and a segment of measurement to the system.

For example, the UE may report its position, velocity and time. Associated with this position, velocity and time, there is also a measurement of raw data captured by the UE. These information may be sent together in one message or in a set of messages. The NTN satellite can receive the information and forward (if needed via gateway) to the secure PRS server, which provides feedback whether the location is spoofed or not. The validated and/or authenticated position, can then be used as a basis for customization of satellite services (for example, language, filtered content, etc.).

Likewise, the validated position could be a basis for triggering an appropriate national authority for rescue efforts, providing country-relevant solutions, firewalls, etc. Embodiments allow the network to use the network entities and UE to collect the integrity faults together and allow the network to determine the area over which to broadcast the integrity fault to.

1) Support low capability UE in terms of GNSS processing power to avoid spoofed signals.

2) Support low latency alert of integrity faults.

According to an embodiment, the protection level computed for a UE when the ranges are computed using GNSS signals may be compared with the protection level computed for a UE when the ranges are computed using GNSS and/or at least one RAT-dependent technology. By comparing the difference in the protection level for different combination of positioning system, the LMF may decide provide one or the other location solution (position, velocity and/or time) to the LCS client. Alternatively, LCS client may choose to use one or the other position system so that its requirements are satisfied. As an example, if the protection level for GNSS is computed to be 3 m, multi-RTT to be 4 m, and combined protection level for GNSS and multi-RTT to be 5 m and the alert limit is 4 m, then the positioning system may determine GNSS as the positioning system to meet the integrity requirements of positioning.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 16:
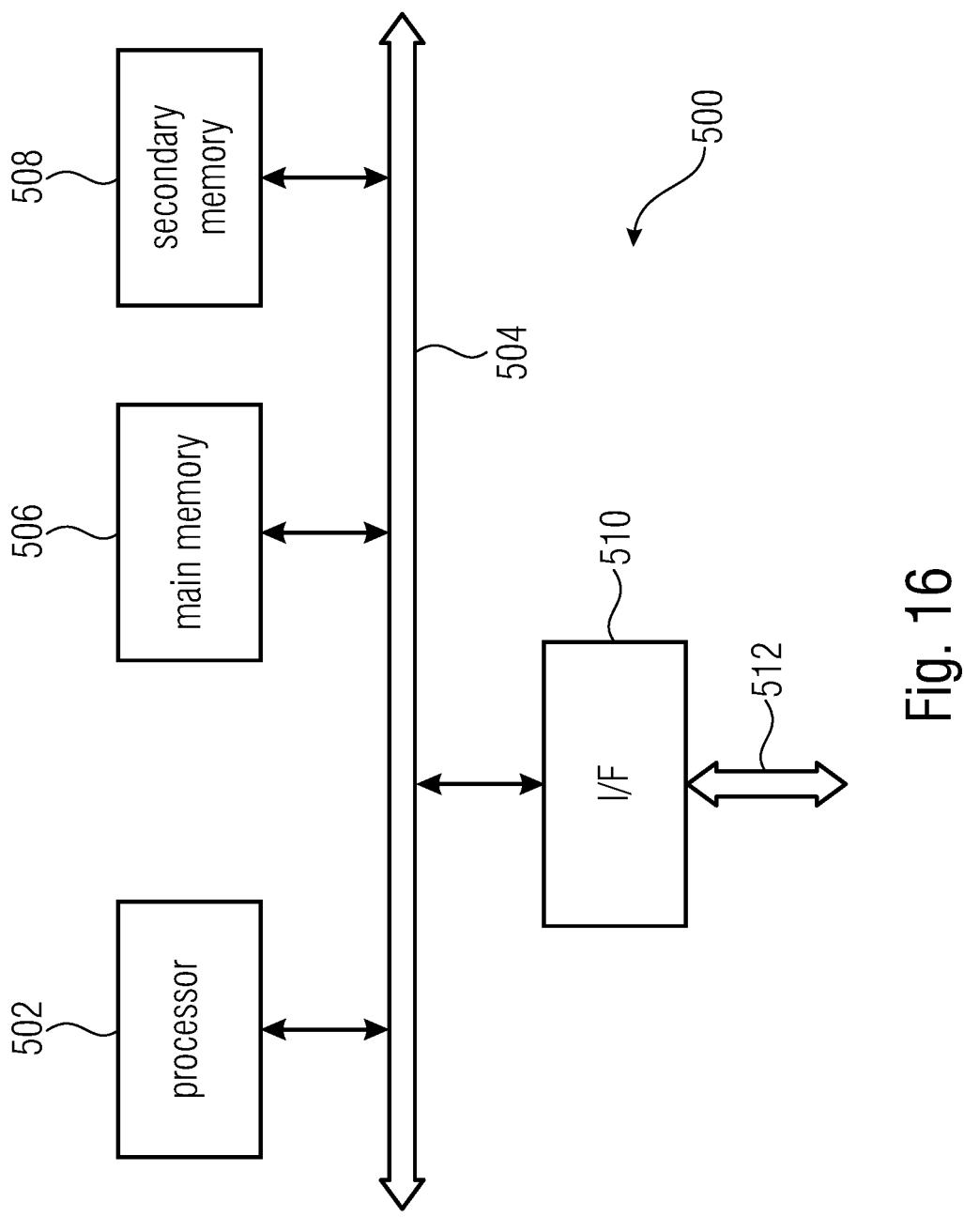
FIG. 16 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 16 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Abbreviations

3GPP third generation partnership project
AAIM aircraft autonomous integrity monitoring
AL alert limit
AMF access and mobility management function
ARAIM advanced receiver autonomous integrity monitoring
BS base station
BWP bandwidth part
CBG code block group
D2D device-to-device DAI downlink assignment index
DCI downlink control information
DL downlink
FFT fast Fourier transform
GMLC gateway mobile location center
gNB next generation node B—base station
GNSS global navigation satellite system
HAL horizontal alert limit
HARQ hybrid automatic repeat request
IoT internet of things
LCS location services
LMF location management function
LPP LTE positioning protocol
LTE long term evolution
MAC medium access control
MCR minimum communication range
MCS modulation and coding scheme
MIB master information block
MO-LR mobile originated location request
MT-LR mobile terminated location request
NB node B
NI-LR network induced location request
NR new radio, 5G
NRF Network Repository Function
NRPPa NR positioning protocol-annex
NTN non-terrestrial network
NW network
OFDM orthogonal frequency-division multiplexing
OFDMA orthogonal frequency-division multiple access
PBCH physical broadcast channel
PC5 sidelink interface
PDCCH physical downlink control channel
PDSCH physical downlink shared channel
PL protection level
PLMN public land mobile network
PPP point-to-point protocol
PPP precise point positioning
PRACH physical random access channel
PRB physical resource block
PRS public regulated services (Galileo)
PDCCH physical sidelink control channel
PUCCH physical uplink control channel
PUSCH physical uplink shared channel
PVT position and/or velocity and/or time
PVT position, velocity and time
RAIM receiver autonomous integrity monitoring
RAN radio access networks
RAT radio access technology
RNTI radio network temporary identifier
RS reference symbols/signal
RTK real time kinematics
RTT round trip time
SBAS space-based augmentation systems
SBI service based interface
SCI sidelink control information
SI system information
SIB system information block
SL sidelink
SSR state space representation
TDD time division duplex
TDOA time difference of arrival
TIR target integrity risk
TRP transmission reception point
TTA time-to-alert
TTI transmission time interval
UAV unmanned aerial vehicle
UCI uplink control information

39

UE user equipment
UL uplink
UMTS universal mobile telecommunication system
V2V vehicle-to-vehicle
V2X vehicle-to-everything
VAL vertical alert limit
VRB virtual resource block
WLAN wireless local area network
The invention claimed is:

1. First apparatus, comprising:
a GNSS receiver configured to receive GNSS signals,
a mobile communication transceiver configured to oper-
ate in a mobile communication network,
wherein the first apparatus is configured to determine at
least one parameter based on the received GNSS sig-
nals or use at least one parameter determined by a
second or third apparatus based on GNSS measure-
ments,
wherein the first apparatus is configured to receive with
the mobile communication transceiver a first informa-
tion message from a second apparatus of the mobile
communication network, the first information message
comprising a first integrity information describing an
integrity status of the GNSS signals,
wherein the first apparatus is configured to determine
the at least one parameter in dependence on the first
integrity information, and
report the at least one parameter taking into account the
first integrity information,
wherein the report of the at least one parameter comprises
a quality and uncertainty,
wherein the first integrity information received with the
first information message is based on a second integrity
information from a third apparatus, the second integrity
information describing the integrity status of the GNSS
signals in the geographical or logical area in which first
apparatus is located.

2. First apparatus according to claim 1,
wherein the at least one parameter is at least one out of
a position of the first apparatus,
a velocity of the first apparatus,
a system time,
GNSS measurements.

3. First apparatus according to claim 1,
wherein the first apparatus is configured to determine the
at least one parameter further based on measurements
from at least one out of the following
radio signals,
IMU,
accelerometer,
gyroscope,
barometer,
pedometer,
tachometer,
odometer,
speedometer,
magnetometer,
camera,
lidar.

4. First apparatus according to claim 1,
wherein the integrity information describes the integrity
status of the GNSS signals in a geographical or logical
area the apparatus is located.

5. First apparatus according to claim 1,
wherein the integrity status is at least one out of
an integrity event,
an integrity alert.

40

6. First apparatus according to claim 1,
wherein the first apparatus is configured to report mea-
surements relevant for integrity to the second appara-
tus.

7. First apparatus according to claim 1,
wherein the first apparatus is configured to receive the
information message from the second apparatus via a
downlink channel,
or wherein the first apparatus is configured to receive the
information message from the third apparatus via a
sidelink channel or a downlink channel.

8. First apparatus according to claim 1,
wherein the information message is transmitted using a
location positioning protocol, LPP, provide message.

9. First apparatus according to claim 1,
wherein the first apparatus is a UE.

10. Second apparatus, comprising:
a mobile communication transceiver configured to oper-
ate in a mobile communication network,
wherein the second apparatus is configured to transmit
with the mobile communication transceiver an infor-
mation message to a first apparatus or a group of first
apparatuses of the mobile communication network, the
information message comprising an integrity informa-
tion describing an integrity status of the GNSS signals
in a geographical or logical area in which the first
apparatus or group of first apparatuses is located,
wherein the second apparatus is configured to receive a
report of at least one parameter from the first apparatus,
wherein the at least one parameter is determined by the
first apparatus based on GNSS signals received by the
first apparatus and in dependence on the integrity
information, wherein the report of the at least one
parameter comprises a quality and uncertainty,
wherein the information message is a first information
message, wherein the integrity information is a first
integrity information,
wherein the second apparatus is configured to receive
from a third apparatus a second information message
comprising a second integrity information describing
the integrity status of the GNSS signals in the geo-
graphical or logical area in which first apparatus is
located,
wherein the first integrity information transmitted with the
first information message is based on the second integ-
rity information.

11. Second apparatus according to claim 10,
wherein the second apparatus comprises a GNSS receiver
or another receiver capable of detecting an integrity
status of GNSS signals,
wherein the second apparatus is configured to determine
with the GNSS receiver or the other receiver an integ-
rity status of the GNSS signals and to derive the
integrity information from the determined status.

12. Second apparatus according to claim 10,
wherein the second apparatus is configured to receive
from a third apparatus a third information message, the
third information message comprising a reported posi-
tion and/or time of the third apparatus, and a portion of
GNSS signals received by the third apparatus or mea-
surements of the GNSS signals received by the third
apparatus,
wherein the second apparatus is configured to determine
the integrity status of the GNSS signals based on the
reported position of the third apparatus, and the portion of GNSS signals received by the third apparatus or the measurements of the GNSS signals received by the third apparatus.

13. Second apparatus according to claim 11, wherein the integrity status is at least one out of
    an integrity event,
    an integrity alert.

14. Second apparatus according to claim 10, wherein the second apparatus is configured to transmit an integrity information request message to the third apparatus, the integrity information request message requesting the third apparatus to transmit the second information message comprising the second integrity information,
or wherein the second information message is transmitted using a location positioning protocol, LPP, provide message,
or wherein the second apparatus is configured to transmit the second integrity information as the first integrity information with the first information message,
or wherein the apparatus is configured to derive the first integrity information from the second integrity information,
or wherein the second apparatus is configured to receive from a group of third apparatuses a group of second information messages comprising second integrity information, each describing the integrity status of the GNSS signals, wherein the second apparatus is configured to derive the first integrity information from the group of second integrity information,
or wherein the second apparatus is configured to detect an integrity event or integrity alert based on the second information message or group of second information messages.

15. Second apparatus according to claim 10, wherein the second apparatus is one out of the following:
a base station,
    an LMF,
    an NG-RAN node,
    a local LMF functionality in a NG-RAN node,
    a TRP,
    an AMF,
    an NRF,
    an external server accessing the mobile communication network via a NRF or a gateway,
    an NG-RAN node based on transparent satellite,
    an NG-RAN node based on regenerative satellite with or without inter-satellite link.

16. Second apparatus according to claim 10, wherein the second apparatus is configured to transmit the information message to the first apparatus via a different second apparatus.

17. Second apparatus according to claim 10, wherein the second apparatus is configured to transmit the integrity information to the first apparatus as one out of dedicated control signaling,
    user data,
    control signaling as SIB sent to a group of UEs,
    multicast to a group of UE,
    broadcast,
    unicast.

18. Method for operating a first apparatus, the method comprising:
    receiving GNSS signals,
    operating in a mobile communication network,
    determining at least one parameter based on the received GNSS signals,
    receiving a first information message from a second apparatus of the mobile communication network, the first information message comprising a first integrity information describing an integrity status of the GNSS signals, and
    determining the at least one parameter in dependence on the first integrity information and reporting the at least one parameter taking into account the first integrity information, wherein the report of the at least one parameter comprises a quality and uncertainty,
    wherein the first integrity information received with the first information message is based on a second integrity information of a third apparatus, the second integrity information describing the integrity status of the GNSS signals in the geographical or logical area in which first apparatus is located.

19. Method for operating a second apparatus, the method comprising:
    operating in a mobile communication network, transmitting an information message to a first apparatus or a group of first apparatuses of the mobile communication network, the information message comprising an integrity information describing an integrity status of the GNSS signals in a geographical or logical area in which the first apparatus or group of first apparatuses is located,
    wherein the information message is a first information message, wherein the integrity information is a first integrity information,
    receiving from a third apparatus a second information message comprising a second integrity information describing the integrity status of the GNSS signals in the geographical or logical area in which first apparatus is located,
    wherein the first integrity information transmitted with the first information message is based on the second integrity information.

* * * * *